United States Patent [19]

Moyher

[11] Patent Number: 4,490,904

[45] Date of Patent: Jan. 1, 1985

[54] APPARATUS AND METHOD FOR INSTALLING ELECTRICAL CONNECTORS ON FLAT CONDUCTOR CABLE

[75] Inventor: George C. Moyher, Bridgeport, Conn.

[73] Assignee: Burndy Corporation, Norwalk, Conn.

[21] Appl. No.: 373,931

[22] Filed: May 3, 1982

[51] Int. Cl.³ .................... H01R 43/04; B23P 19/00; B65H 1/00; B65G 1/08

[52] U.S. Cl. ...................... 29/864; 29/751; 29/748; 414/222; 414/224; 414/786; 227/120; 339/17 F

[58] Field of Search ............ 29/864, 843, 844, 758, 29/845, 512, 751, 762, 747, 748; 81/57.37, 431, 435; 227/114, 115, 120, 117, 118, 48; 198/375; 339/17 F; 414/222, 224, 786

[56] References Cited

U.S. PATENT DOCUMENTS

| | | | |
|---|---|---|---|
| 2,618,400 | 11/1952 | Innhof | 29/512 |
| 3,197,729 | 7/1965 | Sarazen . | |
| 3,595,460 | 7/1971 | Pitkin | 227/48 |
| 3,734,377 | 5/1973 | Munn | 227/120 |
| 3,924,917 | 12/1975 | Munshower | 339/17 F |
| 4,066,319 | 1/1978 | Baker et al. | 339/17 F |
| 4,263,474 | 4/1981 | Tennant . | |

FOREIGN PATENT DOCUMENTS 2024084   1/1980   United Kingdom ............... 227/120

OTHER PUBLICATIONS

"Amp-under Carpet Power System", Product Bulletin 1602-1, Amp Inc., Harrisburg, PA.
"T&B/Versa-Trak Under Carpet Wiring System/A Modern Method of Electrical Wiring", Thomas & Betts, Raritan, N.J.
"T&B/Versa-Trak Branch Circuit Wiring for Under-Carpet Installation in Commercial Buildings/Instruction Manual", Thomas & Betts, Raritan, N.J., 7/31/1980.

Primary Examiner—Howard N. Goldberg
Assistant Examiner—Carl J. Arbes
Attorney, Agent, or Firm—Howard S. Reiter

[57] ABSTRACT

Apparatus and method for installing electrical connectors onto flat conductor cables wherein the connectors are fed to the machine from a magazine, transferred from the magazine to a press, captured by the press and then pressed onto and through the cable over an anvil which holds the connector to form a secure connection with the cable. The resulting profile of the connector is such that it extends through the conductor of the cable and is held thereon by a flange on one side of the cable, an eyelet-type crimp on the opposite side of the cable and a lance means. The transfer means includes a connector holder which carries the connector from the magazine to a guide pin on the press. The guide pin captures the connector and retains it as the holder is returned to the magazine. The holder has two regions thereon and automatically switches their orientations as it approaches the press area. The first region includes a ramp to carry the guide pin across the holder to the connector as the holder approaches the press. The second region includes a clearance means to enable the holder to clear the connector as the holder is returned to the magazine after the guide pin captures the connector.

22 Claims, 35 Drawing Figures

FIG. 1a.
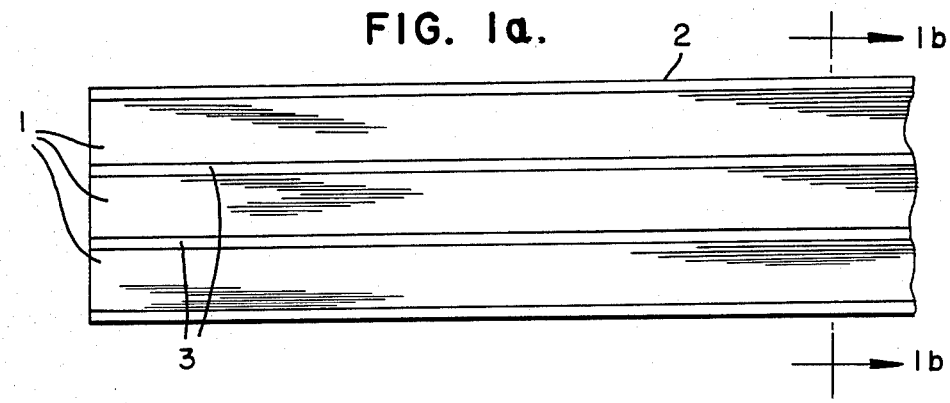
FIG. 1b.
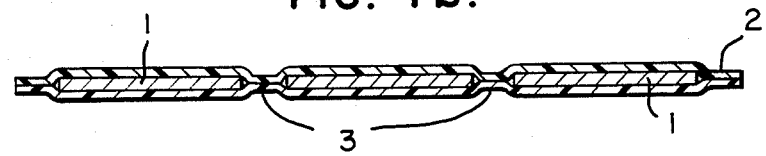
FIG. 2a.      FIG. 2b.
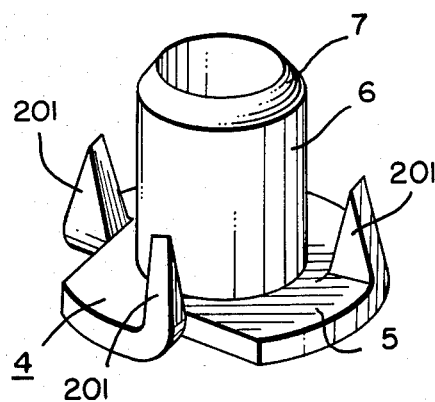 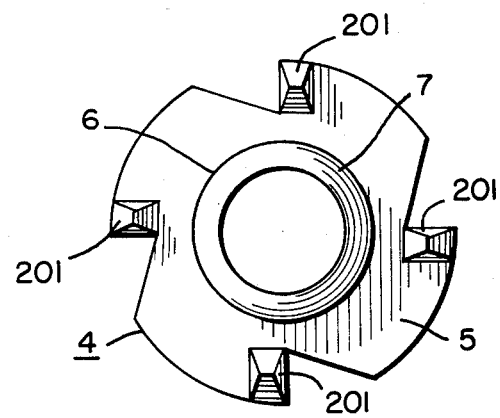
FIG. 2c.      FIG. 2d.
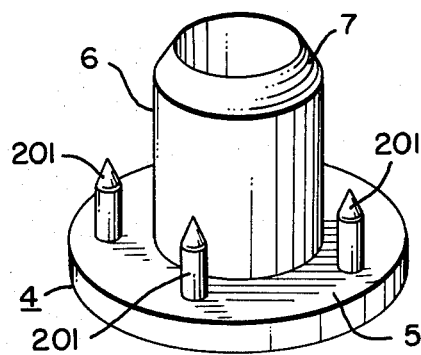 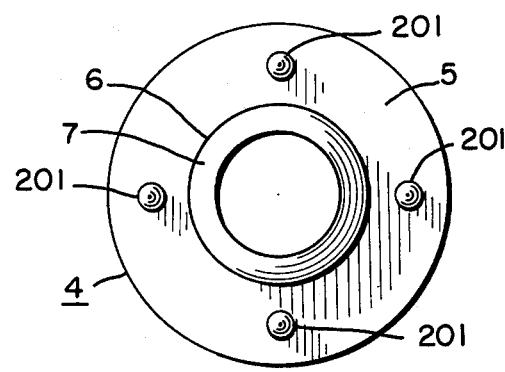

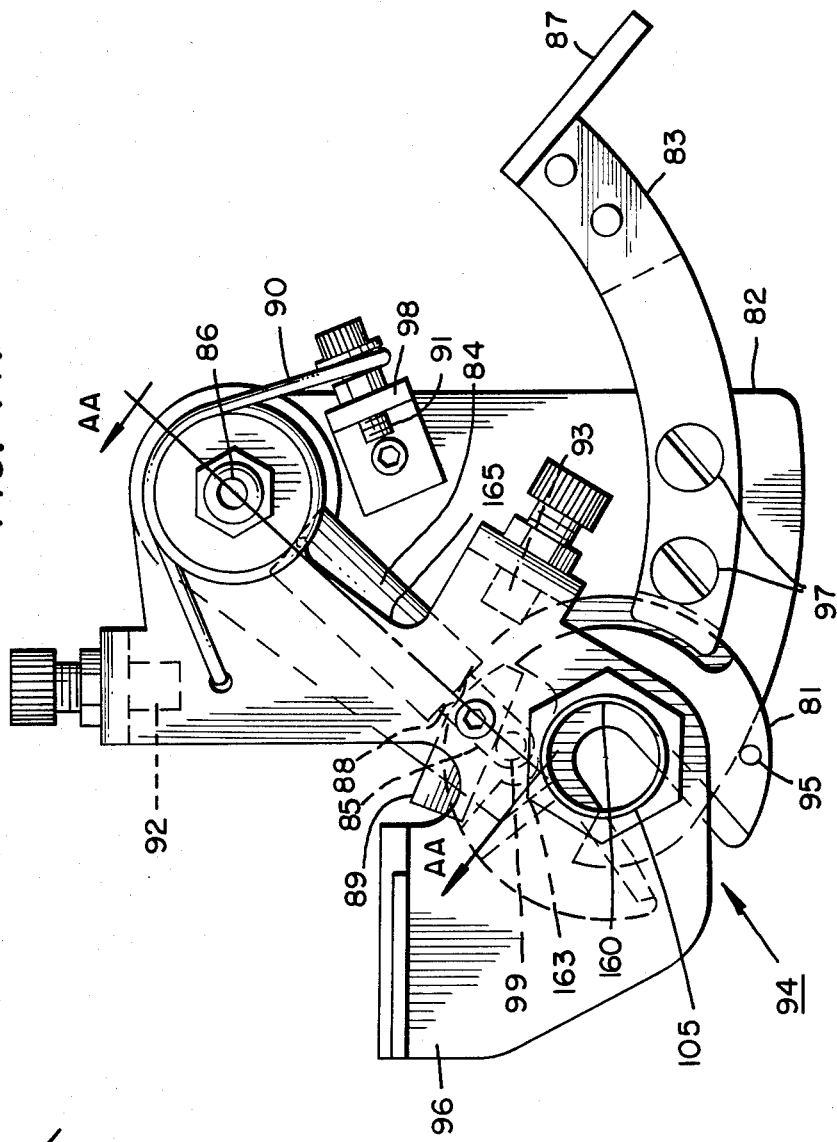
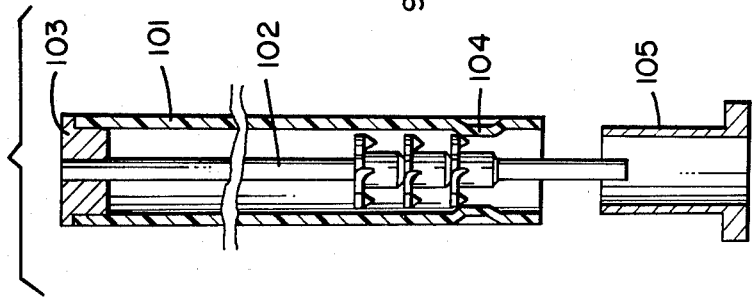

APPARATUS AND METHOD FOR INSTALLING ELECTRICAL CONNECTORS ON FLAT CONDUCTOR CABLE

BACKGROUND OF THE INVENTION

This invention relates generally to electrical connectors and, more particularly, to an apparatus and method for installing electrical connectors onto flat conductor cables.

Flat conductor cable has come into general use in such areas as under-carpet wiring systems. This type of cable carries out the same function as a conventional round wire in distributing electricity to work stations, however, its use does not require underfloor channels, raceways or floor passage holes as does the conventional round wire system. The flat conductor cable is simply laid out on a flat surface, such as the floor, and then carpeting placed over it. The cable is very thin and its presence is not perceivable after the carpeting has been placed over it. The cable itself has a series of parallel flat conductors individually sealed with an insulating jacket which resists moisture, chemicals, object penetration, heat etc. The cable can have any desired number of conductors, three, four and five parallel strips being common.

Versatility of installation layout can be maximized with the use of such cables since they can be flexed and folded without delaminating. However, there is a continuing need for an easy and quick method of installing connectors to the cable. The tasks of making cable splices and cable taps are particularly laborious with some commercially available technology. For instance, various shapes and designs of connectors are required within the range of a normal installation layout. This, in turn, requires an accompanying variety of tools and other components to carry out installation of the connectors. With such an array of connectors and installation tools, such systems generally are very time-consuming to assemble and require elaborate, multi-step instructions for the installer to follow.

Accordingly, it is an object of the present invention to provide an improved apparatus and method for installing connectors onto flat conductor cable.

It is another object of the invention to provide an improved apparatus and method for transferring connectors from a connector source to a press for installation onto a flat conductor cable.

It is another object of the invention to provide an improved apparatus and method for transferring connectors having lances thereon from a connector source to a press for installation onto a conductor cable.

It is a further object of the invention to provide an apparatus and method for installing mechanically strong connections to flat conductor cables.

It is a further object of the invention to provide an apparatus and method for installing connectors to flat conductor cable which form a reliable, repeatable connection every time.

SUMMARY OF THE INVENTION

Briefly stated, and in accordance with the present invention, there is provided a method and apparatus for installing connectors onto flat conductor cables. The connectors are delivered onto a transfer mechanism from a supply of connectors at a loading station and transferred one at a time to an installation station where the connectors are unloaded from the transfer mechanism. The flat conductor cable is placed in a position wherein the portion to which the connector is to be attached lies in the installation station. The connector is aligned with the cable and then pressed into and through the conductor portion of the cable to form an electrical connection therewith. The press receives and retains the connectors on a connector capture means until the connector has been installed onto the cable.

The connectors have a vertical section or post, with a disc-shaped flange, or base, attached to one end thereof. The base has a lance means attached to it which extends in the same general direction as the post. A connector is delivered onto a connector holding means which transfers the connector to the installation station. The holding means guides the connector capture means to a position whereat it captures the connector. As the capture means receives and retains the connector, the holding means automatically reorients itself so that a slot means therein provides clearance for the connector to be removed from the holding means as the transfer mechanism is returned to its loading station.

BRIEF DESCRIPTION OF THE DRAWINGS

FIG. 1a is a top view of a typical flat conductor cable.

FIG. 1b is a front cross-section of the cable in FIG. 1a.

FIG. 2a is a perspective view of a preferred embodiment of the rivet-like connector.

FIG. 2b is a top view of the connector in FIG. 2a looking towards the flange portion thereof.

FIG. 2c is a perspective view of an alternative embodiment of the rivet-like connector.

FIG. 2d is a top view of the connector in FIG. 2c looking looking towards the flange portion thereof.

FIG. 3b is a front cross-section view of the anvil means shown in FIG. 3a.

FIG. 14 is a top view of the transfer mechanism shown in the position to which it is biased, or home position, whereat connectors can be placed onto the transfer mechanism.

FIG. 16c is a section view of the connector holder taken through section A-A of FIG. 16a.

FIG. 17 is a side section view of the supply tube and feed tube.

DETAILED DESCRIPTION OF THE INVENTION

Figure 3A:
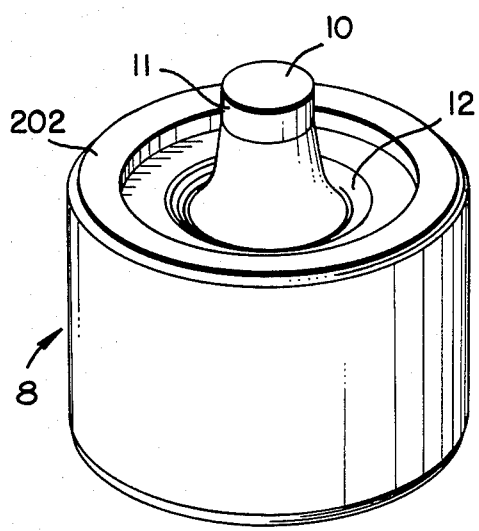

Cross-reference is hereby made to earlier filed U.S. patent application, Ser. No. 314,966, filed on Oct. 26, 1981, and assigned to Burndy Corporation, Norwalk, CT which contains related subject matter. The entire content of the abovereferenced patent application is expressly incorporated herein by reference.

Referring more particularly to the drawings, wherein like reference numerals have been used to the extent practical to designate like elements, FIGS. 1a and 1b illustrate an example of a flat conductor cable. This is the cable onto which the connectors are to be installed. Thin strips of conducting material 1, such as copper, are embedded in or are adheringly surrounded by a thin sleeve 2, or jacket, made of any insulating plastic material, for example, polyester. The metal strips 1 are separated and insulated from each other by spacings 3 at the edges of the cable and between the metal strips. The top and bottom plastic portions of the sleeve are simply bonded to each other at these points.

FIG. 1b is an illustration of the cross-section of such a cable with the thicknesses of the components exaggerated for easier illustration. An example of a three-strip flat conductor cable is type FCC 12 AWWG, 300 volt, 20 amp copper cable sold by Burndy Corporation, Norwalk, Conn., having catalog number PA12-3BLKC. The dimensional thickness of this specific cable is approximately 0.015 inches at the conductor strip, however, this thickness can be varied depending upon application and the manufacturing process. The connection arrangement and procedure of installation of the connector is not in any way limited to any specific gauge or thickness of conductor cable.

The installation machine in this embodiment makes use of an electrically conductive, malleable rivet-like connector element, the preferred structure of which is illustrated in FIGS. 2a and 2b. Connector 4 consists of a thin, disc-shaped flange, or base 5, and a vertical post 6. Post 6 as well as connector 4 are hollow. The opening, or hollow, in the flange and the post are of equal diameters.

Post 6 has a tapered wall at its end opposite the flange. The tapered portion 7 slopes from the top of the post to the outside wall thereof. This tapered feature is designed to assist a suitable puncturing of the conductor cable during the connection procedure, a process that is described in more detail below. The degree of taper of the connector post is not critical, although some degree of taper is required for functioning of the installation process. A preferred degree of taper is about 45 degrees from the vertical.

The dimensions of the basic connector are not critical, per se, however, a preferred range of dimensions works best once one has selected specific types of conducting elements to connect. These dimensions and the general description of the basic connection arrangement are described in an earlier filed U.S. patent application, Ser. No. 314,965, filed on Oct. 26, 1981, and assigned to Burndy Corporation, Norwalk, Conn. The entire contents of the latter patent application are hereby expressly incorporated herein by reference.

The connector also has a lance means 201 extending from flange 5 in the general direction of post 6. The particular embodiment in FIGS. 2a & 2b show four lance means approximately equally spaced around the flange. The purpose of the lance means is to produce a very strong mechanical and electrical connection. Such a high-strength connection is used when the system may be subjected to higher than normal electrical or mechanical stress, produced by very high power surges which cause cyclical contraction and expansion of the eyelet connector or the cable materials themselves.

The lance means can be made into any convenient shape and of any suitable material. The lance means can be formed as a unitary part of the flange, as depicted in FIGS. 2a & 2b, or can be attached to the flange in a separate manufacturing step. FIGS. 2c & 2d show an alternative embodiment of the lance means. For a more complete description of the lance means, its function and the manner in which it cooperates with the other elements of the connector upon installation, reference is had to a co-pending U.S. patent application, Ser. No.

367,487, filed of even date and assigned to Burndy Corporation, Norwalk, Conn.

The material of construction of the connector is compressible, or malleable, on the application of force in order to be cold formable into the eyelet shape desired at the end of the procedure. Additionally, the connector material is preferably electrically conductive to approximately the same extent as the conductivity of metal strips 1. The most direct way of matching the conductivities is to use the same materials for both components. For instance, if the conductor of the cable is copper, the connector can be made of copper or a copper alloy. The surface of the connector can be coated with a suitable lubricant to enhance the connecting procedure to reduce or eliminate any tendency for the connector to adhere to the anvil means and ease the removal of the completed connector from the anvil means.

Figure 3B:
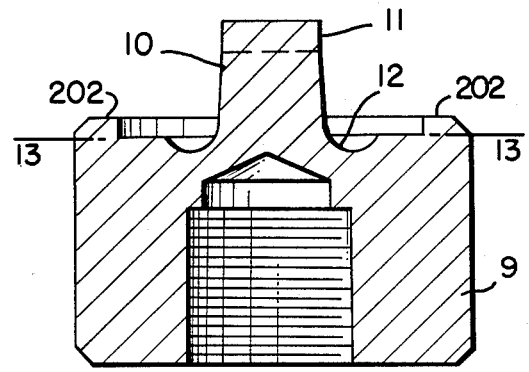

FIGS. 3a and 3b illustrate the anvil means used to install the connector onto a flat conductor cable. The shape and construction of the anvil means is important for the proper functioning of the installation tool. Anvil 8 is comprised of a high-pressure resistant material, such as polished steel. The relative motion which occurs between connector 4 and anvil 8 causes the connector to be formed into the final desired shape. A suitable compressing device to assemble the connector to the flat cable is described herein in conjunction with FIGS. 10 & 11. In the preferred compressing device, anvil means 8 is held stationary with respect to the movement of the compressing means, or ram, and connector. However, it is not crucial to the installation tool which of the connector or anvil means moves with respect to the other. It is the relative movement between the two which is important.

Anvil 8 consists of a relatively disc-like base 9 to which is attached a generally vertical post or stud 10. Base 9 contains ridge 202 which, while not essential, is preferred to brace the cable during the puncture phase while installing a lanced connector. The upper portion 11 of post 10 is perpendicular with respect to the base and the post thereafter is gently tapered outward until it reaches the base. At that point, the post opens up into curved circular well 12 formed in the base. Specifically referring to FIG. 3b, line 13-13 represents a surface on anvil base 9 which passes over well 12 through post 10 for purposes of reference.

It is seen that well 12 is generally u-shaped and surrounds post 10 where it is connected to base 9. The purpose of the slight outward tapering of anvil post 10, which occurs below upper portion 11, is to force the malleable rivet post placed thereover to expand in an outward direction as the top of the rivet post reaches well 12. At this point it begins to expand further outward and around the puncture made in the flat conductor cable.

Figure 4:
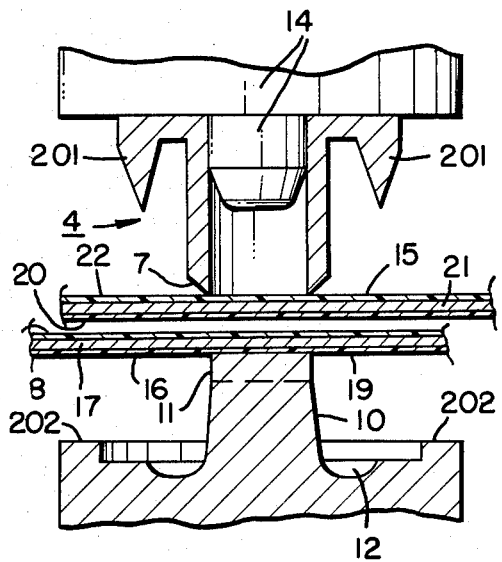
FIG. 4 is a schematic illustration of the anvil means, connector, ram and flat conductor cable just prior to the beginning of the installation process.

The sequence of cable puncturing and electro-mechanical fixation of the connector is described with reference to FIGS. 4-7. Referring to FIG. 4, ram 14 holds connector 4 over anvil means 8 such that post 6 is perfectly concentric with post 10 of anvil 8. Resting on top of the anvil, for purposes of this illustration, are portions of two flat conductor cables which are to be electrically connected by connector 4. Both portions of the two cables contain, of course, a conductive metal strip, since the object is to electro-mechanically connect the two cables. The portion of flat conductor cable 15 resting immediately on anvil 8 comprises a bottom plastic insulated layer 16, a layer of copper 17 and a top layer of insulating plastic 18. Directly above cable 15 is another flat conductor cable 19, immediately over the anvil, having a bottom plastic layer 20, adjacent plastic layer 18, a middle copper strip 21, and an upper plastic layer 22.

Figure 5:
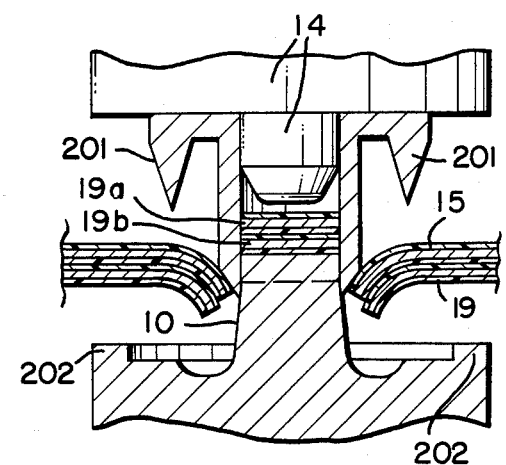
FIG. 5 is a schematic illustration of the same members shown in FIG. 4 just after the cable has been punctured by the post during the installation process.

Referring now to FIG. 5, ram 14 of the compressing means has moved connector 4 down forcibly against cables 15 and 19. In so doing, post 6 of connector 4 has passed over the top of post 10 and anvil 8. Since the inner diameter of the rivet post is slightly larger than the diameter of the upper portion of the anvil post, this swift downward action results in a rupturing of cables 15 and 19 due to the combined forces of tapered edge 7 of connector post 6 and the resistance fit between the connector post and anvil post. The lances do not contact the cables at this phase of the cycle.

Figure 6:
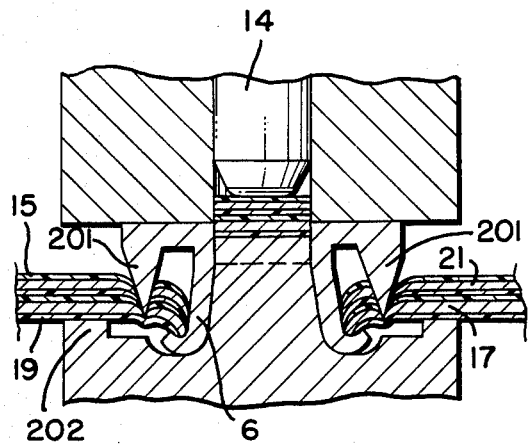
FIG. 6 is a schematic illustration of the same members shown in FIG. 4 as the lance means punctures the cable and just after the initiation of cold forming which forms the eyelet configuration on the connector post.

Referring now to FIG. 6, as the downward stroke of the compression means continues, the leading edge of post 6 enters the tapered area of post 8 and is spread outward as a result thereof. As the leading edge continues further downward and encounters well 12, cold forming of post 6, as defined by the shape of the wall, commences. Meanwhile lance means 201 has partially punctured the cable sandwich, making electrical contact with copper strips 17 and 21.

Figure 7:
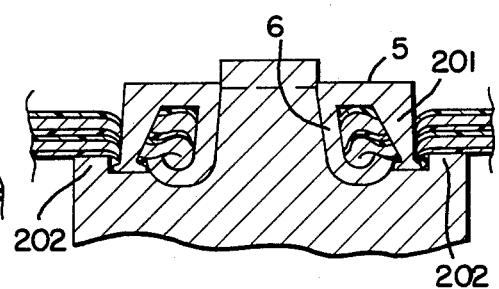
FIG. 7 is a schematic illustration of the same members shown in FIG. 4 after the connector has been completely installed on the flat conductor cable.

Referring now to FIG. 7, the compression stroke continues to the end and forces the post of the connector to cold form into a round eyelet shape. The post end curls under, around and up to clinch the cable sandwich on the underside of cable 15 against plastic insulating layer 16 in the direction of the flange 5. At the same time, lance means 201 completely punctures the cable sandwich and the end portion thereof, which passes completely through the cable sandwich, is slightly blunted and bends slightly outward from the anvil and post. The other side of the cable sandwich is tightly secured by flange 5.

As a result of completing the cycle, the eyelet portion 23, lance means 201 and flange 5 form a pinch clamp to mechanically secure the connection. It can be clearly seen from FIG. 7 that the conductive strips 17 and 21 are in intimate contact with the inside of eyelet 23, thus ensuring a good electrical connection. It has been found that a compression force of between 2000 lbs. and 3500 lbs produces excellent results.

Figure 8:
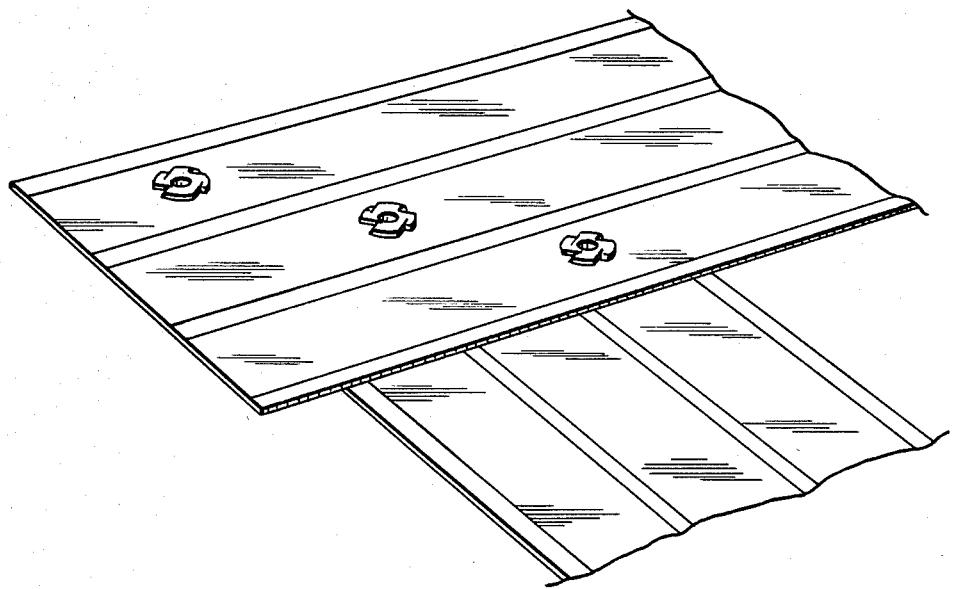
FIG. 8 is a perspective view of the finished cable connection from the flange side of the connector.
Figure 9:
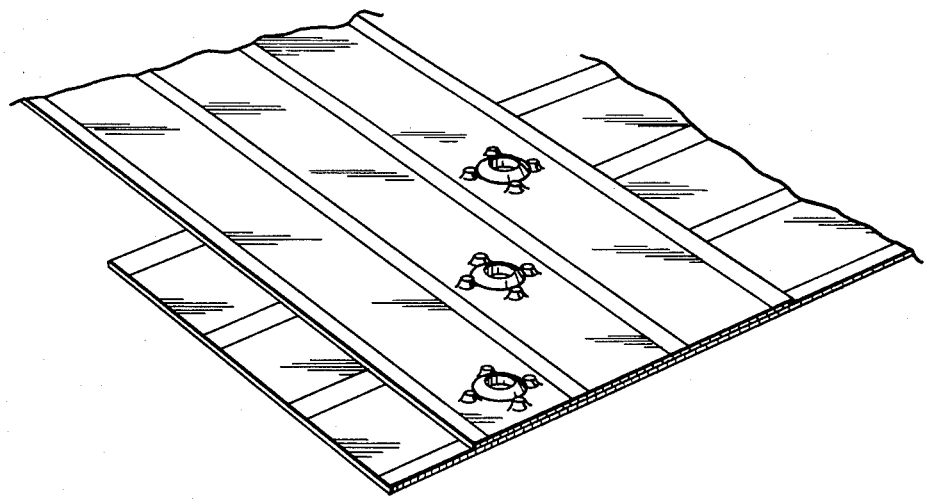
FIG. 9 is a perspective view of the finished cable connection from the eyelet side of the connector.

Referring to FIG. 8a, a finished connection of two flat conductor cables is illustrated looking onto the flange side of the connector. FIG. 8b illustrates the cable connection looking from the other side of the cable; that is, the eyelet side of the connector. As can be appreciated, a sturdy electro-mechanical clamping relationship is created.

Although the connection arrangement and method is described with respect to the joining of two flat conductor cables, such as occurs in cable tapping or cable splicing, this invention also embraces terminal or transition fittings. Normally, the connector is driven through and clamps the top and bottom portions of a single flat conductor cable in transition fittings.

Figure 10:
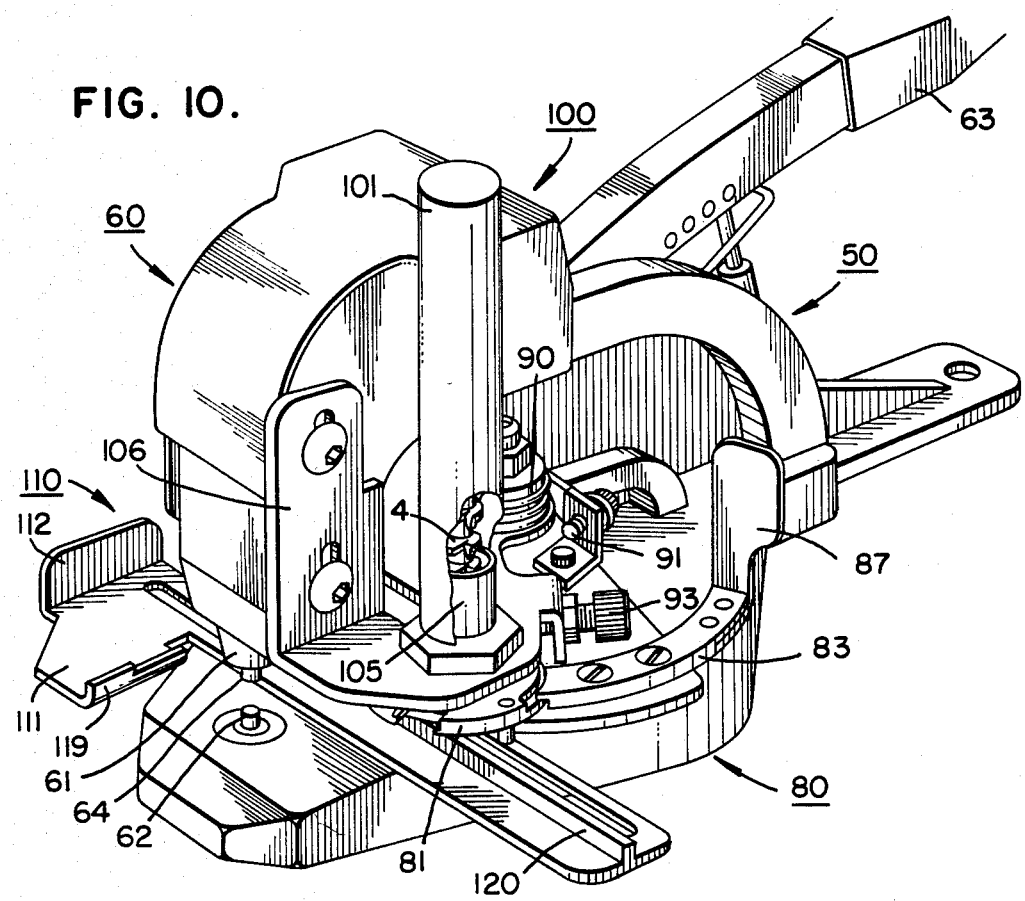
FIG. 10 is a perspective view of the installation machine.

Attention is now drawn to the series of FIGS. 10-16 and 20-28 which depict the machine or tool used for installing flat conductor cable connectors. Referring to FIG. 10, there is shown a perspective of the connector installation machine. The apparatus, which is hand-operated in this embodiment, includes several subsystems which are mounted on frame 50. These include press 60, transfer mechanism 80, supply of connectors 100 and locator assembly 110.

The supply of connectors is magazine-loaded so that the connectors can be delivered to the transfer mechanism one at a time. The transfer mechanism, after removing the connector from the supply, aligns the connector with ram 61. An operator places the portion of the flat conductor cable, which has been predetermined to have the connector attached thereto, on anvil 62 below ram 61.

Locator assembly 110, when appropriate, serves to locate the flat conductor cable in precisely the right position to have the connector attached to its conductor such as when one makes up an end connection. The press is then activated by the operator pushing on press handle 63 which forces ram 61, and the connector loaded thereon, down onto the flat conductor cable to make a connection therewith in one continuous action. The connector applied to the flat conductor cable in this fashion punches through the flat conductor cable and mechanically secures itself thereto.

Figure 18:
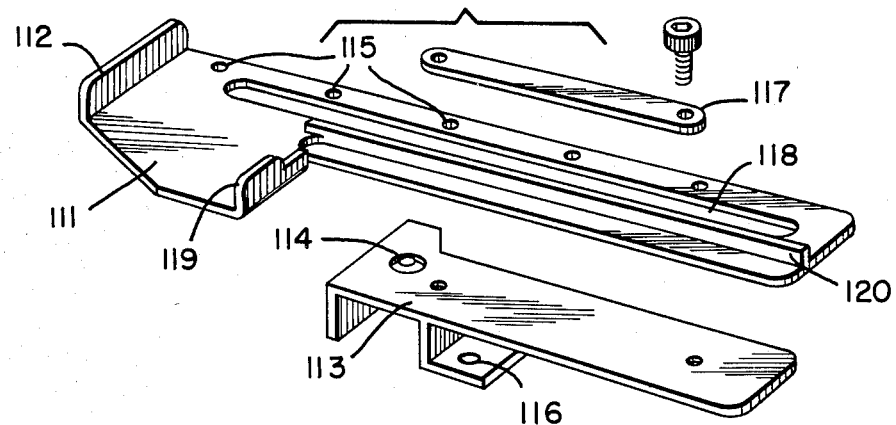
FIG. 18 is an exploded perspective view of the locator assembly.
Figure 19:
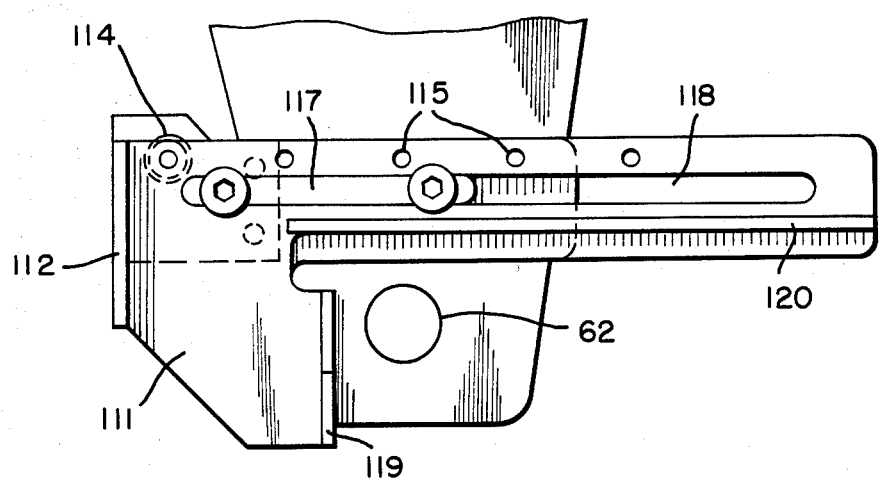
FIG. 19 is a top view of the locator assembly showing it mounted on the machine.

Locator assembly 110 is shown in detail in FIGS. 18 and 19. FIG. 18 is a perspective view of the assembly while FIG. 19 is a top view showing it mounted on the apparatus. The function of the locator assembly is to serve as an aid to quickly place the approximate centerline of the conductive strips of the flat conductor cable on the anvil.

Flat conductor cable is manufactured for several applications and can contain any number of parallel conductive strips. It is generally necessary to make connections to all of the strips. By providing a slideable locator assembly with detent positions corresponding to placing each conductive strip on the anvil, the process of making connections is speeded up with the apparatus. The locator assembly accurately positions the cable conductors so that the connector is installed in the appropriate location to mate with the spacing of the terminal, or transition, block electrical connectors.

The locator assembly includes locator plate 111 which is mounted on locator plate mounting base 113. Base 113 is attached through a detent, showing in FIG. 19, which interacts with mounting detent holes 116. Locator plate 111 can be selectably moved by push tab 112 relative to mounting base 113 so that a multitude of positions can be attained. Bar 117, which is mounted on the machine frame with screws, interacts with slot 118 enabling the locator plate to move relative to the frame.

The positions are located through position detent 114 which interacts with detent holes 115 on the locator plate. Holes 115 are located so that when the operator places a flat conductor cable onto the locator plate with one edge resting against side guide 119 and the cable forward edge resting on front guide 120, he can move the plate to the various positions interacting with detent 114. Each position corresponds to placing a different conductive strip of the cable over the anvil. The detent positions can be made adjustable to the type of cables being used. The locator assembly has been found to be most useful in transition connectors and can be detached from the frame of the machine, when appropriate, such as when cable splices and cable taps are being connected.

FIG. 17 is referred to for additional detail on the connector supply. FIG. 17 is a side view of the supply magazine. The machine has permanently mounted to it, through mounting plate 106, feed tube 105 which is adapted to receive connectors from the magazine and feed them to the transfer mechanism. Connectors are supplied to the feed tube in a column contained by supply tube 101. Connectors 4 are oriented in the column so that their non-flanged end drops into the feed tube and transfer mechanism first. The connectors are held in alignment in the supply tube by guide rod 102 which, in turn, is held on the tube by member 103.

The operator places a preloaded magazine, open-end first, onto feed tube 105. Supply tube 101 contains a series of ribs 104 which hold the connectors within the supply tube before it is placed on feed tube 105. As supply tube 101 is inserted onto feed tube 105, the shape of the feed tube spreads out the ribs of the supply tube thereby allowing connectors to drop into the feed tube. The feed tube is mounted onto the frame of the machine.

FIGS. 12–16 and FIGS. 20–28 are referred to for details of the transfer mechanism. The function of the transfer mechanism is to receive one connector at a time from the supply tube, transfer or relocate the connector to a position in alignment with the ram and accommodate the loading of the connector onto the ram.

Figure 12:
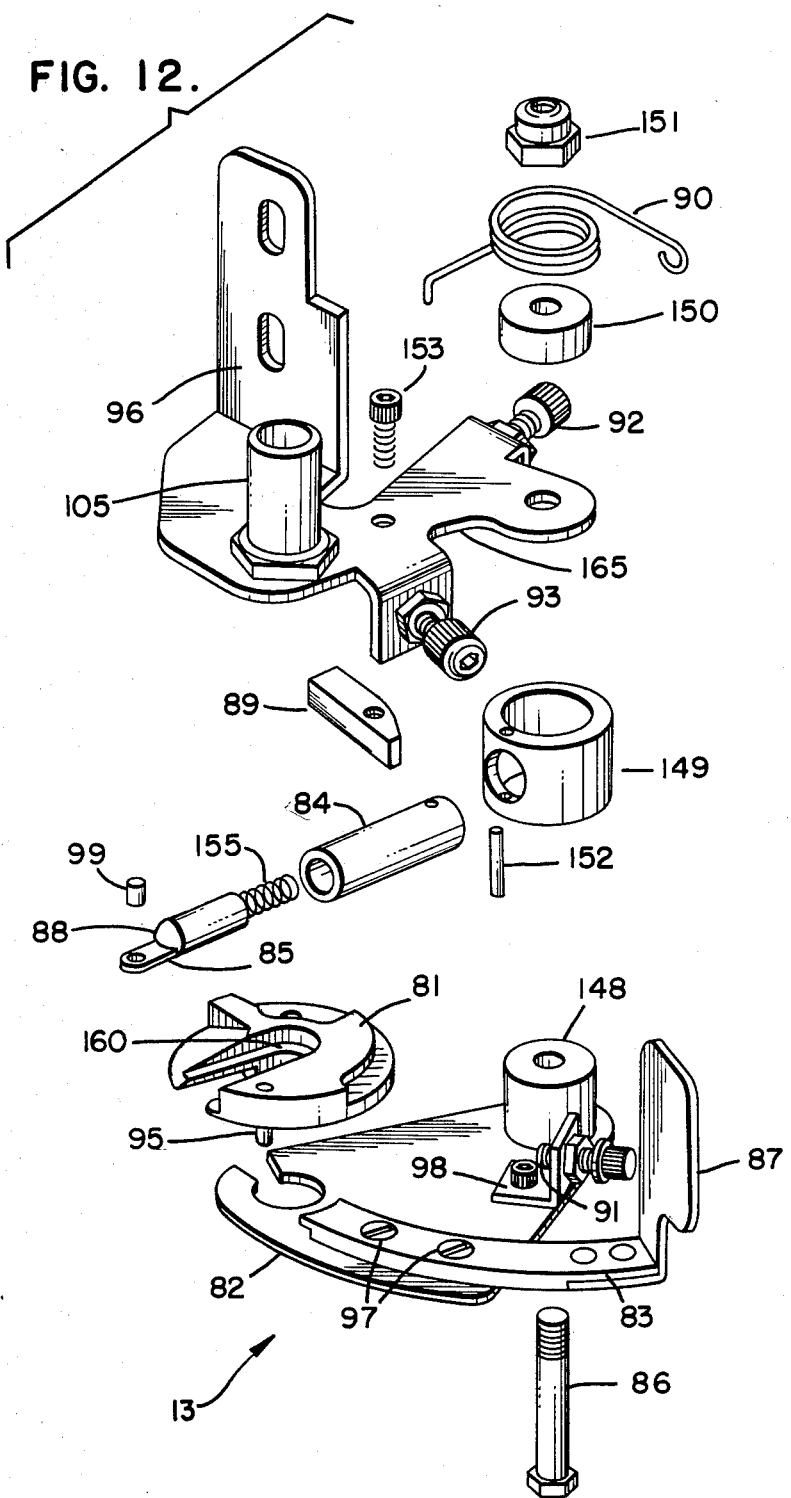
FIG. 12 is an exploded view of the transfer mechanism.
Figure 13:
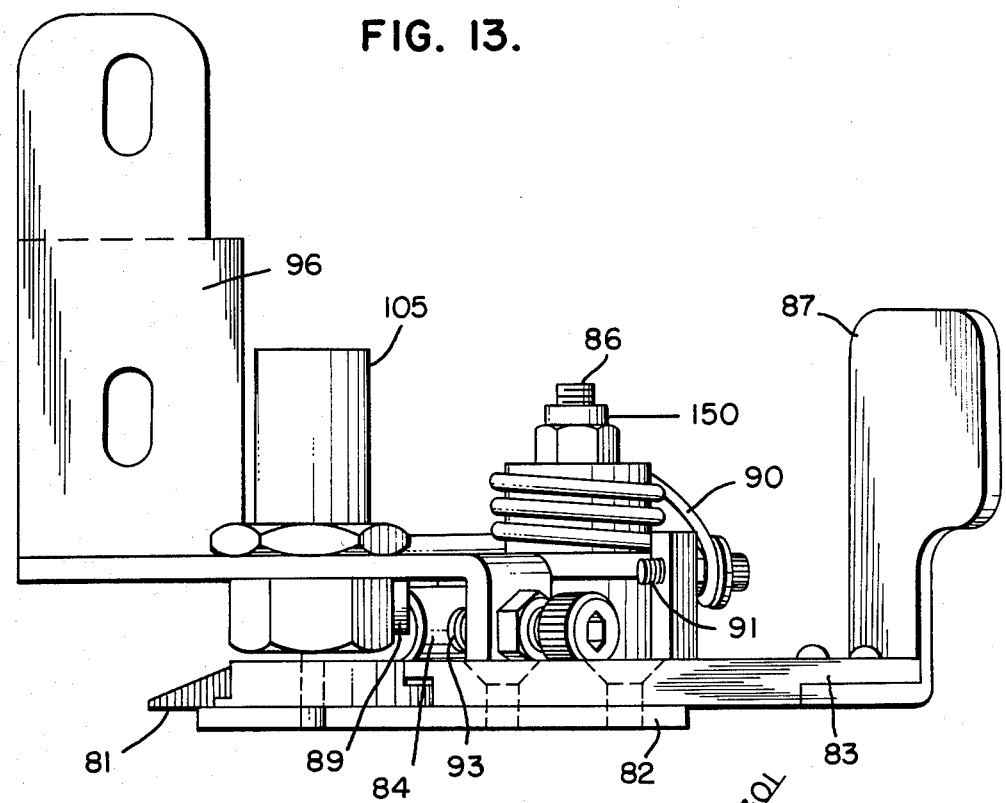
FIG. 13 is a side view of the mechanism in FIG. 12 taken along arrow 13.

Referring more particularly to FIGS. 12–14, the transfer mechanism includes a carry member, carry plate 82, and a connector holding means, holder 81, operatively supported thereby. Carry plate 82 is adapted to rotate from a loading station, or home position, to an unloading station about stud 86. The term "loading station" refers to the position where connectors are loaded onto the holder while the term "unloading station" refers to the position where connectors are unloaded from the holder and retained by the press for installation on the cable.

Figure 16A:
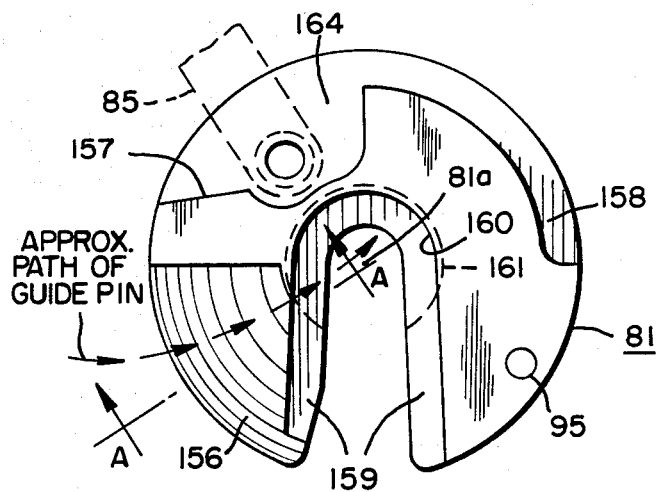
FIG. 16a is a top view of the connector holder showing the path of the guide pin thereon as the opening in the connector flange and post approach the guide pin.

The connector is received by a connector receiving means, recessed pocket 160, most clearly seen in FIG. 16a, located in holder 81, for holding or retaining the connector during the transfer process. Connector holder 81, after receiving the connector, guides a connector capture means, guide pin 64 shown in FIG. 10, for capturing and retaining a connector towards the opening in the connector. Upon reaching the opening, the guide pin drops into it as the carry plate carries the connector holder finally into the unloading station. As the opening in the connector approaches the guide pin, holder 81 is automatically rotated so that a clearance means, slot 94, is re-oriented to provide clearance for enabling the removal of the connector. Such removal occurs as the carry mechanism returns to its loading station from the unloading station.

The configuration and operation of connector holder 81 is adapted to serve two important purposes in the mechanism; first, to provide the surface upon which guide pin 64 is brought to and into the opening in the connector and, second, to provide clearance for the connector as the carry plate brings the connector holder back to the loading station. The operation of the connector holder, during the movement of the carry plate, is described in more detail in conjunction with FIGS. 20–28.

The full cycle of the transfer mechanism is as follows. In the loading station, or home position, shown in FIG. 14, the transfer mechanism receives a connector. Connector holder 81, at this time, is located directly below feed tube 105. The portion of the connector holder immediately below feed tube 105 is recessed receiving pocket 160 which holds the connector during the transfer process. As carry plate 82 is returned to the position shown in FIG. 14 at the end of the previous cycle, the receiving pocket is empty. When the pocket reaches the position just underneath the supply tube, as shown in FIG. 14, there is room for one connector to drop out of the feed tube and into the pocket. Since the level of the skid 83 is approximately flush with the top surface of the connector holder and the connector in the pocket, further connectors cannot drop into the transfer mechanism until this connector is removed. This happens after the transfer mechanism has been again cycled from the loading station to unloading station and the connector is unloaded from the transfer mechanism.

Figure 24:
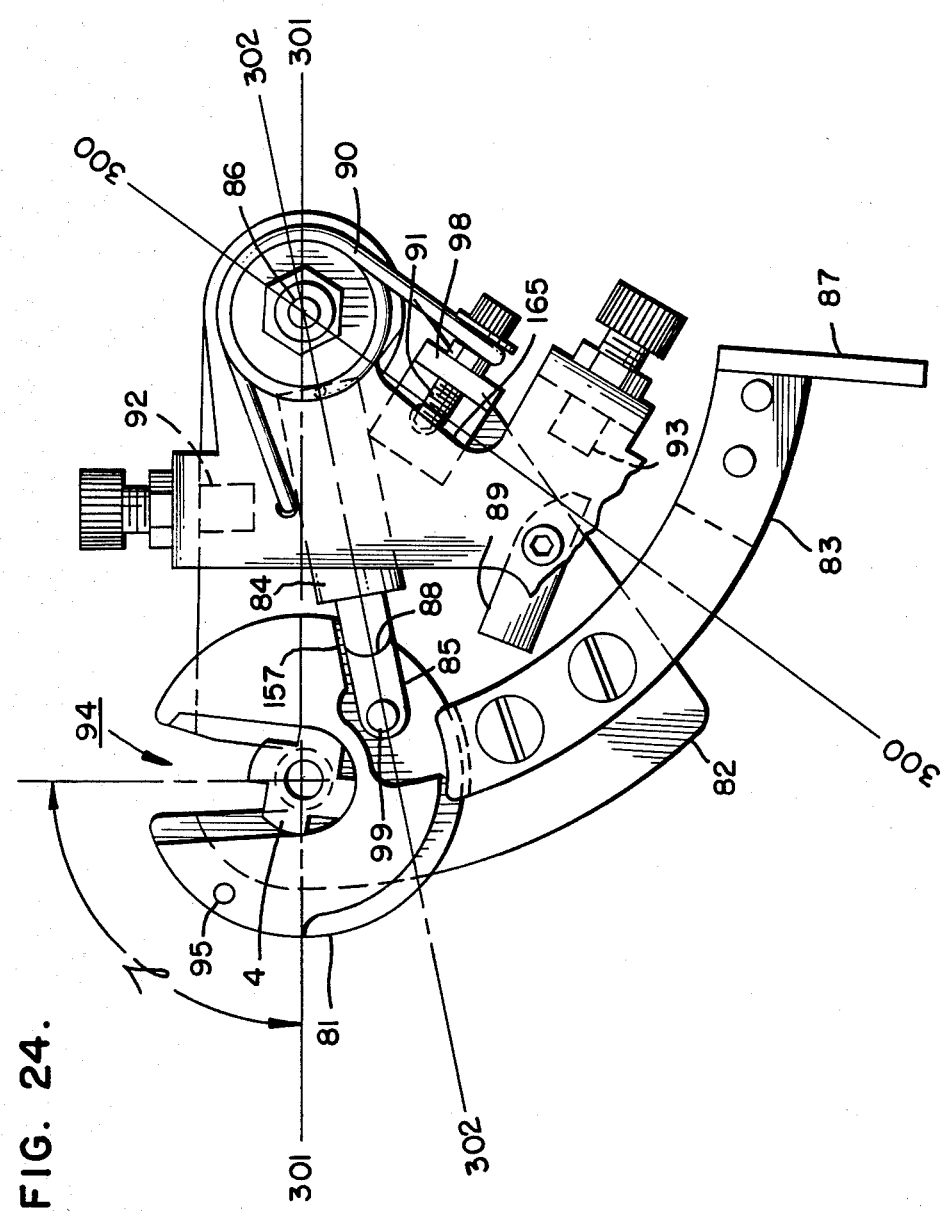
FIG. 24 is similar to FIG. 21 showing the positions of the same elements at the time when the transfer mechanism is in the unloading station.

To accomplish the transfer process, force is applied to handle 87, such as by an operator, about stud 86 bringing carry plate 82 in a clockwise direction to the position shown in FIG. 24. FIG. 24 shows the transfer mechanism in the unloading station, a position wherein the connector is brought into alignment with the ram, anvil and portion of a flat conductor cable that is to have a connector attached thereto. This forms the installation station.

Figure 28:
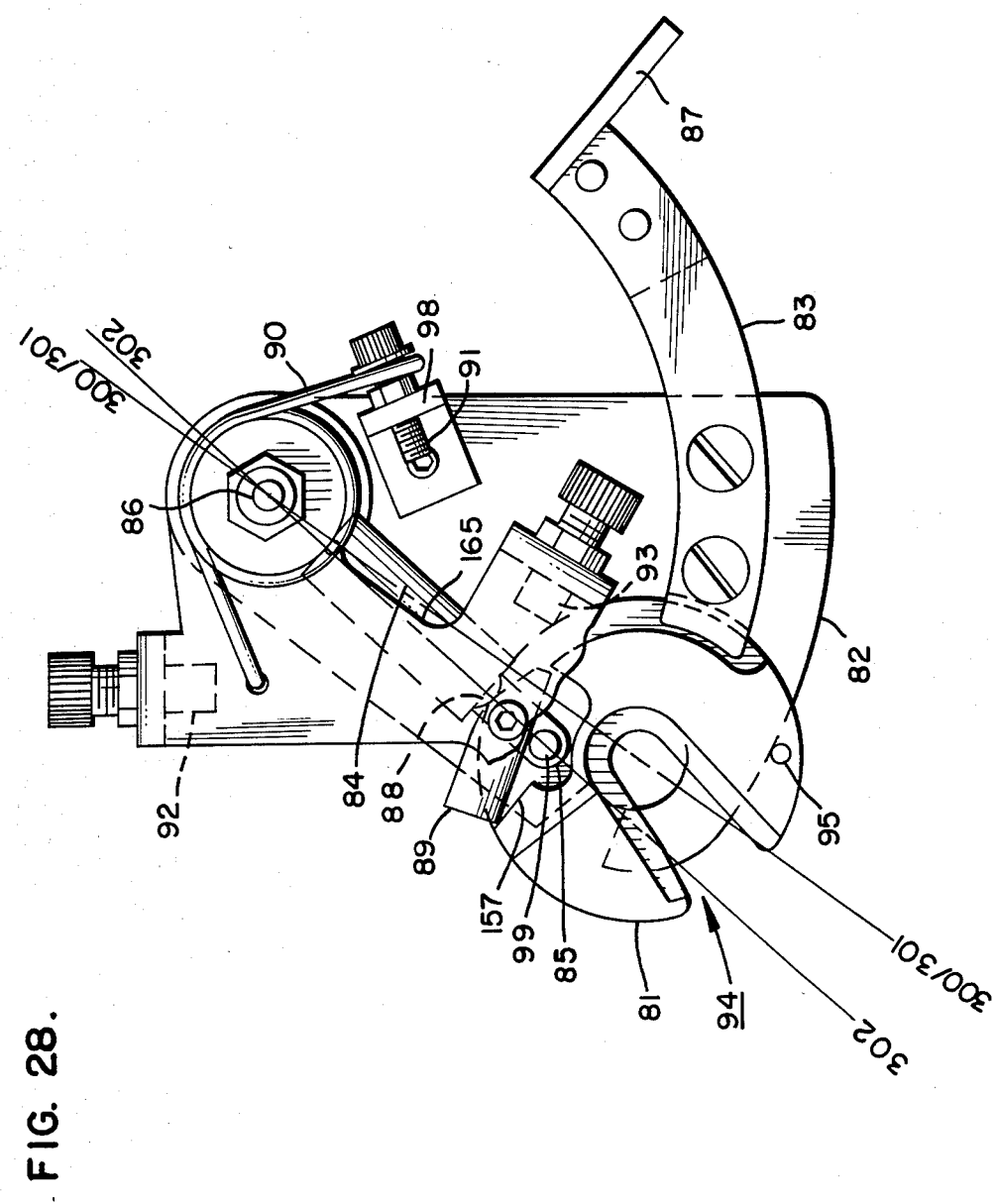
FIG. 28 shows the same members as in FIG. 21 after the transfer mechanism has fully returned to the loading station and is ready to accept another connector.

Once the transfer mechanism reaches the position shown in FIG. 24 and the connector is captured by guide pin 64 on the ram and held thereby, the operator releases handle 87. A spring mechanism, shown in FIG. 20, automatically returns the transfer mechanism to its home position and the connector is unloaded from holder 81. The home position is shown in FIG. 28. As the transfer mechanism approaches its home position, the receiving pocket of the holder is empty and the next connector drops into the receiving pocket upon the pocket's arrival beneath feed tube 105.

Referring again to FIGS. 12–14, the transfer mechanism is made up of a number of cooperating elements. Carry plate 82 has skid 83 mounted thereon which is fastened to the carry plate by screws 97. Handle 87, by which the carry plate is brought from the loading station to the unload station, is mounted on skid 83. To move the transfer mechanism, the operator grasps handle 87 and forces it in the clockwise direction FIG. 14 until the loading station is reached. This is determined when stop 91 strikes cooperating edge 165 of support 96. The operator then releases the handle, the force on the handle being dissipated thereby, and the carry plate is automatically returned to its loading station position.

The carry plate also supports connector holder 81, the holder being rotatable relative to the carry plate so that clearance slot 94 can be re-oriented relative to the carry plate between the latter's loading and unloading station. Connector holder 81 has stop pin 95 extending away from the connector holder towards the carry plate so that when the connector holder returns to its loading station, stop pin 95 is brought up against the edge of carry plate 82 to precisely locate the connector holder.

Figure 16B:
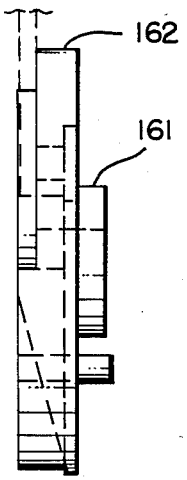
FIG. 16b is a side view of the connector holder.

Connector holder 81 includes shank portion 161, most clearly seen in FIG. 16b, which simply rests in an opening in the carry plate allowing the connector holder to rotate freely on the carry plate. Bracket 98 is mounted on carry plate 82 and supports adjustable stop 91. Spring 90 cooperates with stud 86 and carry plate 82 through adjustable stop 91 and bracket 98 to bias the carry plate into the loading station, or home position.

The motion of the connector holder is dictated by the action or pusher arm 85 which is connected to holder 81 through pin 99. The oscillation of pusher arm 85, and, hence, the rotation of holder 81, is controlled by the position of tube bushing 84 and cam 88 which is attached to pusher arm 85. Cam 88 cooperates with cam follower 89 which is mounted on support bracket 96. The position of tube 84 is determined by the position of the carry plate and the interaction of tube 84 with adjustable stops 92 and 93. Support bracket 96 also holds, or provides a mount for, feed tube 105 and locates the feed tube over the receiving pocket in connector holder 81 when carry plate is in its loading station.

Figure 20:
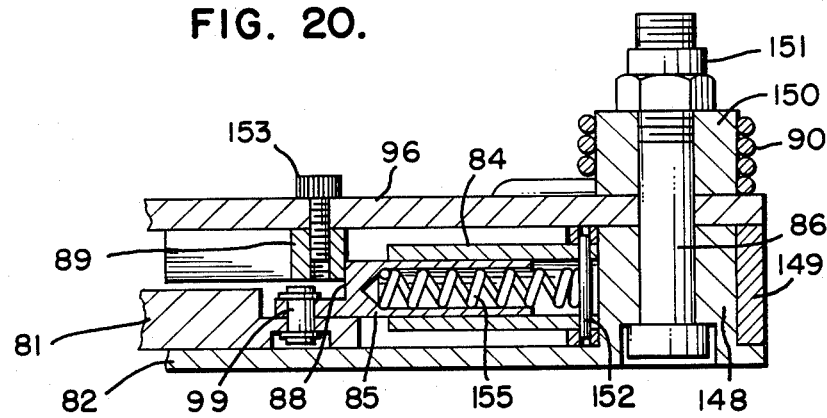
FIG. 20 is a partial section view of the transfer mechanism in the vicinity of the stud upon which it rotates taken along section A-A of FIG. 14.

A more complete description is provided for the support of carry plate 82 with reference to FIG. 20. The carry plate, and the mechanism thereon, is mounted onto support bracket 96 through its hub portion 148 by stud 86. The end of stud 86 opposite the hub portion of the carry plate has spring bushing 150 supporting spring 90 and nut 151 fastening the stud to the support bracket. Hub 148 is surrounded by sleeve 149.

With this arrangement of components, support bracket 96 is stationary while carry plate 82 and its associated mechanism can rotate relative to the support bracket. Connector holder 81 is held by carry plate 82 and is rotatably joined to pusher arm 85 through pin 99. Pin 99 is attached to holder 81 and pusher arm 85 rotates about the pin so that the holder and the pusher arm move relative to one another.

One end of pusher arm 85 is supported by tube 84 and reciprocates back and forth relative to the tube. Tube 84 is supported for rotation on pin 152 which is attached to carry plate hub 99. Cam 88, which is part of pusher arm 85, cooperatively interacts with cam follower 89 which is mounted on support bracket 96 by screw 153. Pusher arm spring 155 is joined on one end to the pusher arm and on the other end to member 155 which is joined to and moves with tube 84. The significance of the pusher arm spring is discussed in detail below.

Figure 15:
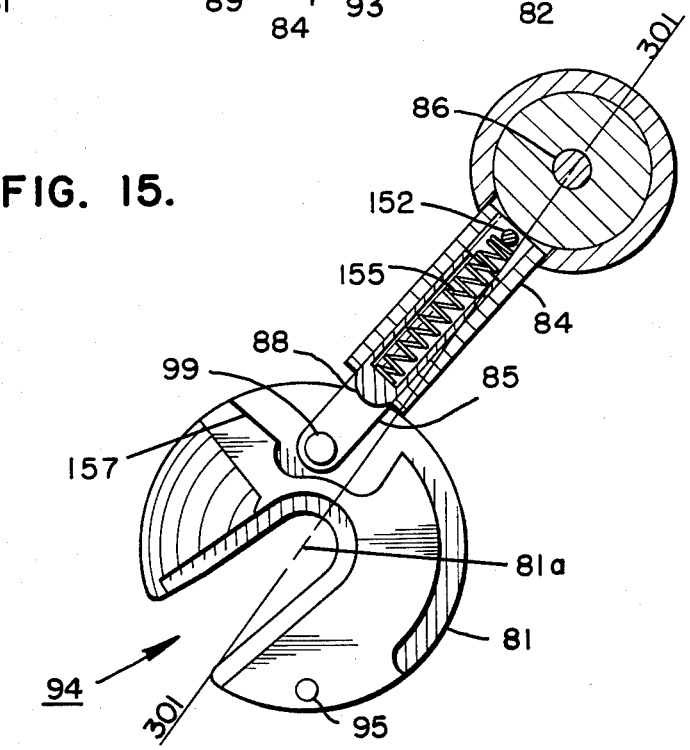
FIG. 15 is a partial top view of the transfer mechanism showing the tube bushing and snap-over spring which control the rotation of the connector holder.

Another view of the relationship of the pusher arm, holder and stud is shown in FIG. 15. Stud 86 is fixed while tube 84 and pusher arm 85 are free to rotate about pin 152. Connector holder 81 is free to rotate about the carry plate (not shown), the center of rotation being at point 81a. Pusher arm 85 and connector holder 81 are free to move relative to each other through pin 99. Spring 155, in conjunction with the position of tube 84, forms a snap-over mechanism in terms of controlling the rotation of connector holder 81.

The position shown in FIG. 15 is that taken when the transfer mechanism is in its loading station. In this position, spring 155 urges pusher arm 85 out from tube 84 to the extent permitted by the counter clockwise rotation of connector holder 81. The rotation of the holder in this direction is limited by stop pin 95 which rests against the carry plate 82 (not shown in FIG. 15) in this position. Thus, while in the loading station, the action of spring 155 tends to push against the pusher arm 85 which, in turn, tends to keep the connector holder 81 in its most extreme counter clockwise position.

When reference line 301—301, which passes through the carry plate center of rotation and the connector holder center of rotation, is drawn, it can be seen that the force provided by spring 155 provides a torque which keeps the connector holder in this position as long as it is on the left side of the reference line. On the other hand, if tube 84 were moved counter clockwise to the point where pusher arm 85 and spring 155 are brought into alignment with reference line 301—301 and the continue to a position slightly to the right of reference line 301—301, the action of spring 155 would urge pusher arm 185 further in the counter clockwise direction as referenced around stud 86. This movement would continue until the holder reaches the limit of allowable rotation. As tube 84 is moved counter clockwise against the action of spring 155, holder 81 turns clockwise also. However, once tube 84 and spring 155 cross-over reference line 301—301, spring 155 snaps over and urges the holder in the clockwise direction due to the change in torque relationship.

The limit of rotation of the holder in the clockwise direction is essentially controlled by shoulder 157 on connector holder 81. Shoulder 157 comes to rest against pusher arm 85 and prevents further rotation of the pusher arm in the counter clockwise directions and the holder in the clockwise direction. As tube 84 is pushed through alignment with reference line 301—301 and the action of spring 155 urges the pusher arm more completely in the counter clockwise direction, connector holder 81 is forced to rotate in the clockwise direction bringing clearance slot 94 therein into a new position. The new position of the slot is such as to provide clearance for the connector to be removed from holder 81 as the carry plate returns to its loading position.

Thus, when spring 155 and tube 84 are in any position other than aligned with reference line 301—301, spring 155 creates a snap-over mechanism which tends to drive the pusher arm out of tube 84 and rotate holder 81 to the limit of travel in that direction. If tube 84 is rotating in the counter clockwise direction as it passes through alignment with reference line 301—301, it tends to urge the holder to rotate in the counter clockwise direction after it passes through alignment with the reference line. The function of this motion on the holder is more fully described in conjunction with FIGS. 21 through 28 below.

Figure 16C:
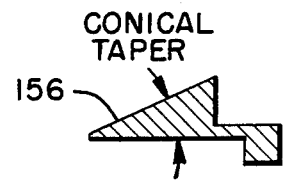

FIGS. 16A-C show the details of connector holder 81. The connector holder has shank 161 and body 162. Shank 161 fits into opening 163 in carry plate 82 (shown in FIG. 14) and can rotate freely relative to the carry plate about point 81a. Body 162 of connector holder 181 has a number of different features. The body contains shoulder 157 against which pusher arm 85 (shown partially in phantom lines in FIG. 16a) abuts when holder 81 has reached the limit of its clockwise rotation. Pin 99, mounted on holder 81, is urged by the motion of pusher arm 85, which is able to rotate about the pin.

The body of holder 81 also has a pusher arm recessed area 164 and skid recess area 158 which provide clearance for the action of the holder 81 relative to the pusher arm and skid. The body of holder 81 contains a ramp means or region, ramp 156, which guides guide pin 64 (shown in FIG. 11) up and across the holder as the holder brings the connector towards the guide pin. The approximate path of the guide pin across ramp 156 to the center of rotation 81a of holder 81 and then into the opening in the connector is depicted by arrows in FIG. 16a.

The shape of ramp region 156 can be any suitable one to properly guide the guide pin to the connector. An example of the cross-section of the ramp region is shown in FIG. 16c, the ramp in this embodiment having a conical taper with a ramp angle of approximately 21 degrees. FIG. 16c is a cross-section of the ram taken through section A—A of FIG. 16a. As the holder approaches the guide pin, the guide pin first strikes the edge of the holder in ramp region 156 and then the guide pin is guided up the ramp into the region of connector pocket means 160.

A connector is not shown in the holder 81 in FIG. 16a. However, circle 160 represents the receiving pocket in which a connector would reside. The pocket is shaped so that the lances on the connector rest on ledge 159 of holder 81. The depth of the ledge is such that the top of the connector is flush with the top of ramp 156. As the guide pin reaches the top of ramp 156, it passes onto the flange portion of a connector in pocket 160. As the holder enters the installation station, the guide pin continues across the top of the flange of a connector in holder 81 until it drops into the opening in the connector. Holder 81 and carry plate 82 have now reached the unloading station.

The path of the guide pin is depicted as arclike in FIG. 16a. This is because holder 81 rotates in the clockwise direction relative to the carry plate as holder 81 and carry plate 82 approach the unloading station. The purpose of this rotation is to place clearance slot 94 in the appropriate orientation to enable the connector to be removed from holder 81 as the carry plate brings holder 81 back to the loading station.

Holder 81 is rotated in the clockwise direction during the final stages of its approach to the unloading station. This is because ramp 156 must be provided in the appropriate position to lift the guide pin up into the opening of a connector in pocket 160 in the first stages of the holder's approach to the unloading station. After the guide pin is beyond the ramp, the clearance slot can be brought into position to enable removal of the connector from the holder. As can be seen in FIGS. 16a and 16b, the clearance slot is shaped to provide clearance in both the shank 161 and body 162 of holder 81.

Figure 21:
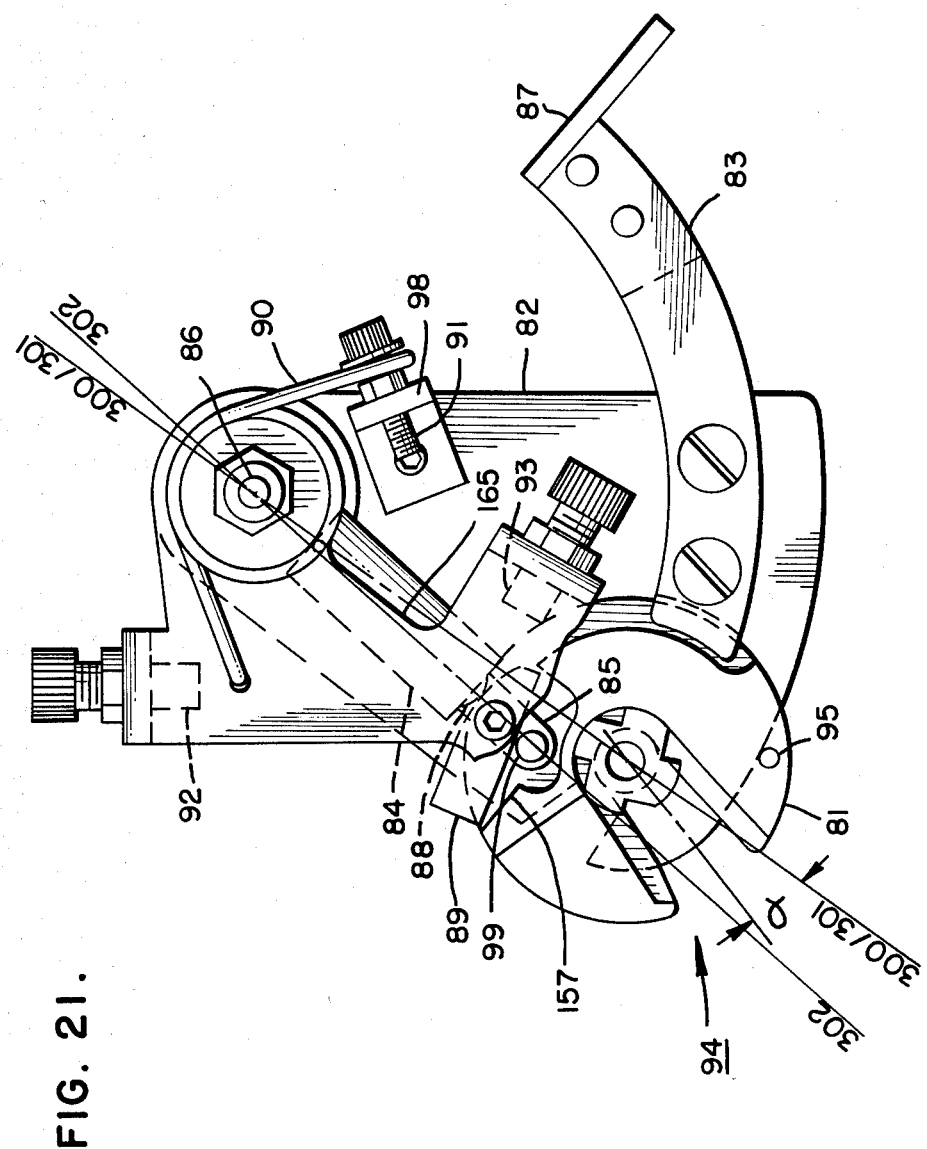
FIG. 21 is a schematic illustration of selected elements of the transfer mechanism and related members in the loading station with a connector loaded onto the mechanism.

FIGS. 21-28 are now referred to for a detailed description of how the carry plate operates. These Figures purposely depict only selected parts of the transfer mechanism for ease of description. FIG. 21 shows the carry plate in its loading station, or home position. It is in this position that a connector is allowed to drop from the magazine into pocket 160 (FIG. 16a) of holder 81. The position of the transfer mechanism, and its related elements, shown in FIG. 21 is the initial position in the loading/unloading cycle. The operator grasps handle 87 and swings the transfer mechanism in the clockwise direction to bring the connector to the unloading station.

Figure 22:
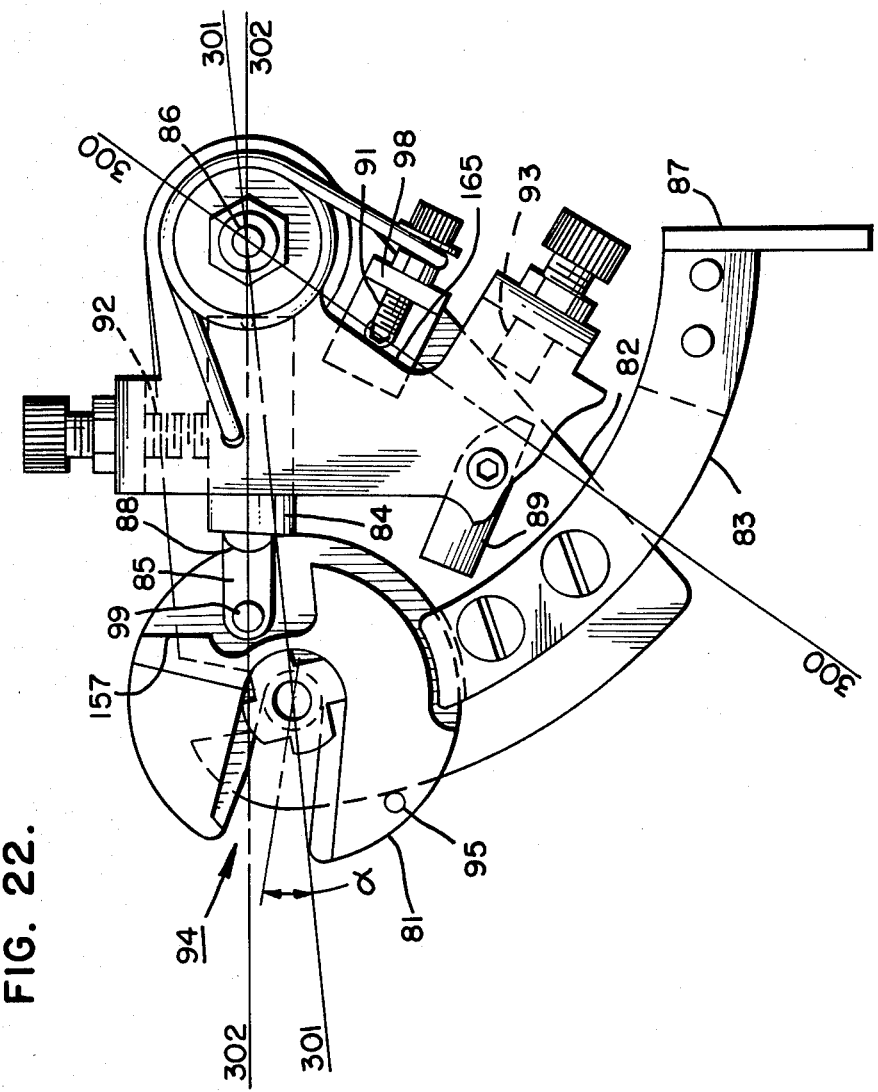
FIG. 22 is similar to FIG. 21 showing the positions of the same elements at the time that the first stop contacts the tube bushing after the transfer mechanism leaves the loading station.
Figure 23:
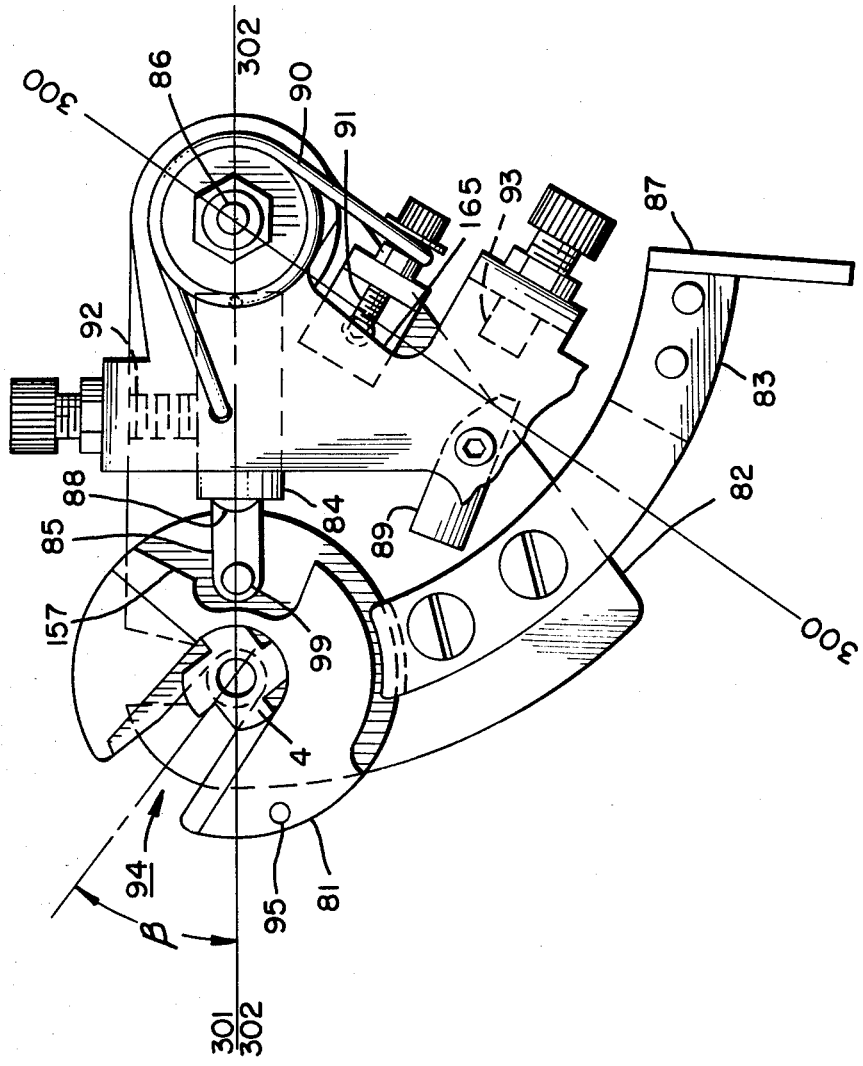
FIG. 23 is similar to FIG. 21 showing the positions of the same elements at the time that the tube bushing is pushed by the first stop into alignment with a line drawn between the center of rotation of the carry plate and the center of rotation of the connector holder.
Figure 25:
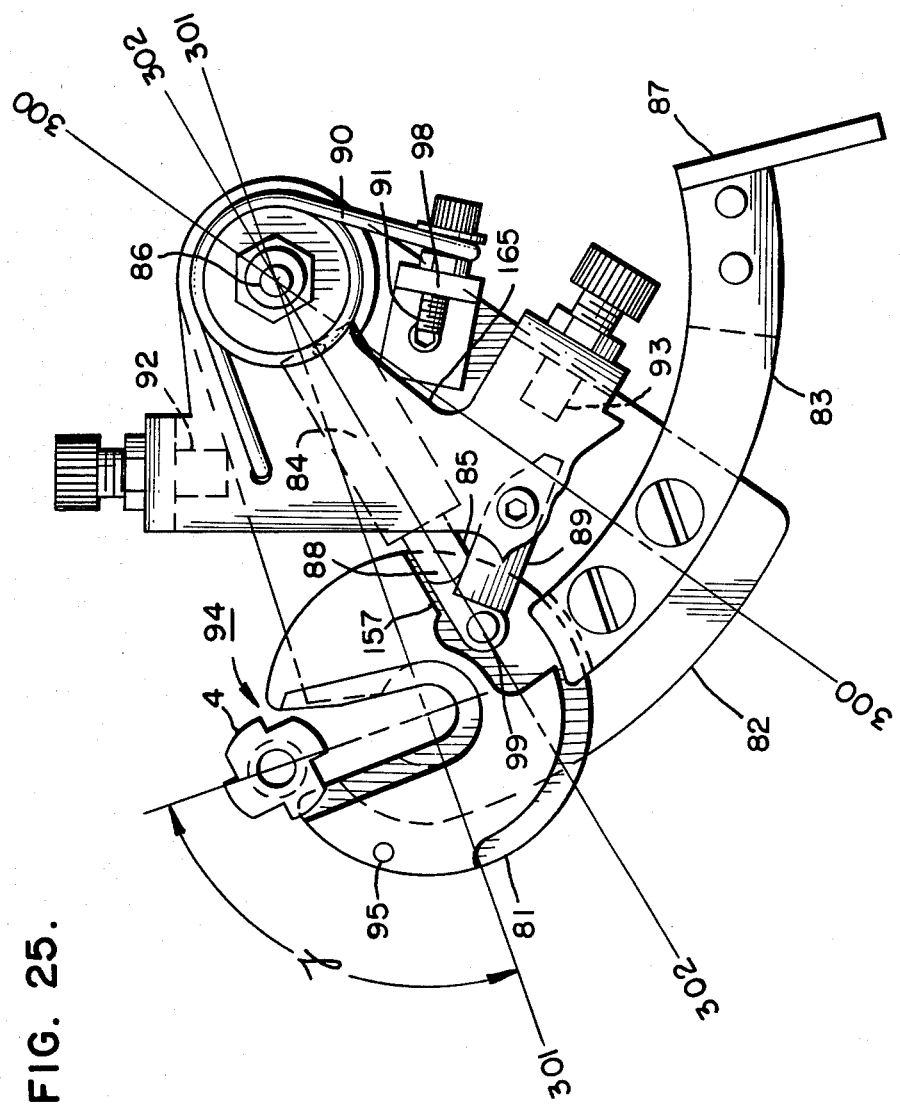
FIG. 25 is similar to FIG. 21 showing the positions of the same elements at the time that the cam on the pusher arm contacts the cam follower after the transfer mechanism leaves the unloading station and the connector has been removed therefrom.
Figure 26:
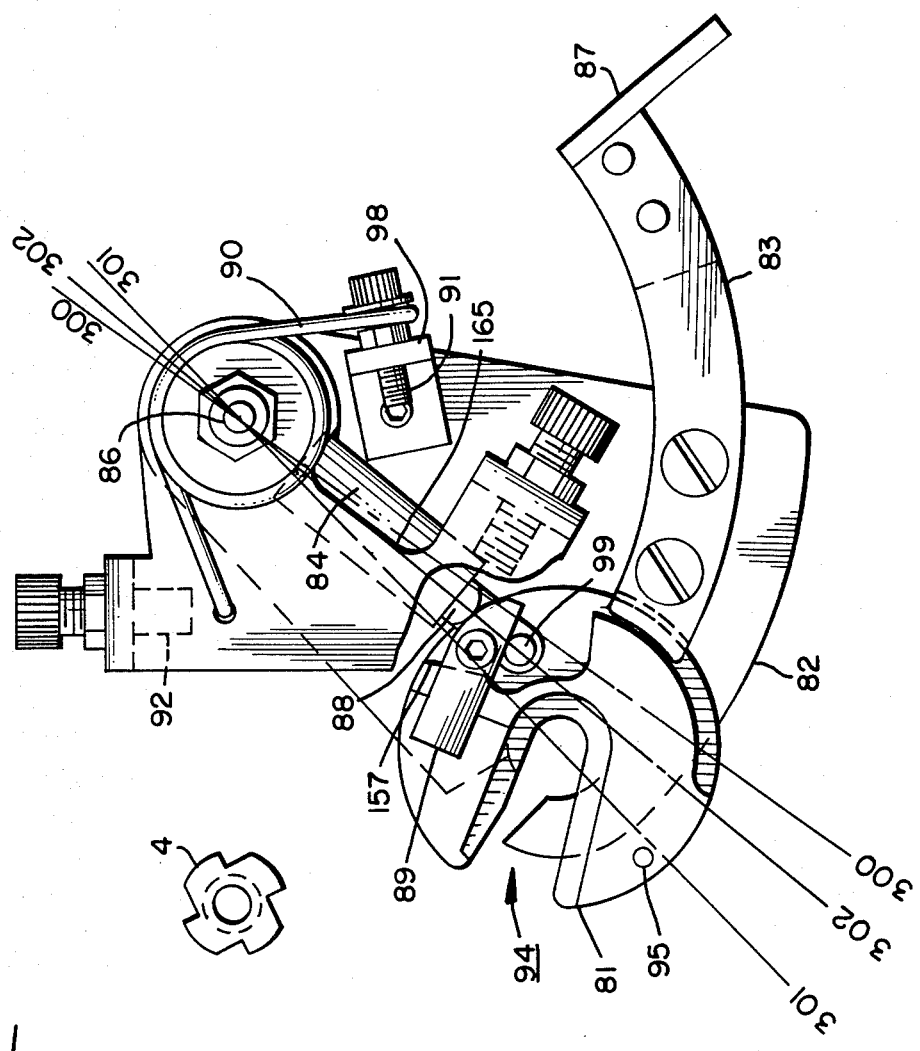
FIG. 26 is similar to FIG. 21 showing the positions of the same elements at the time that the second stop contacts the tube bushing as the transfer mechanism travels from the unloading station back to the loading station.
Figure 27:
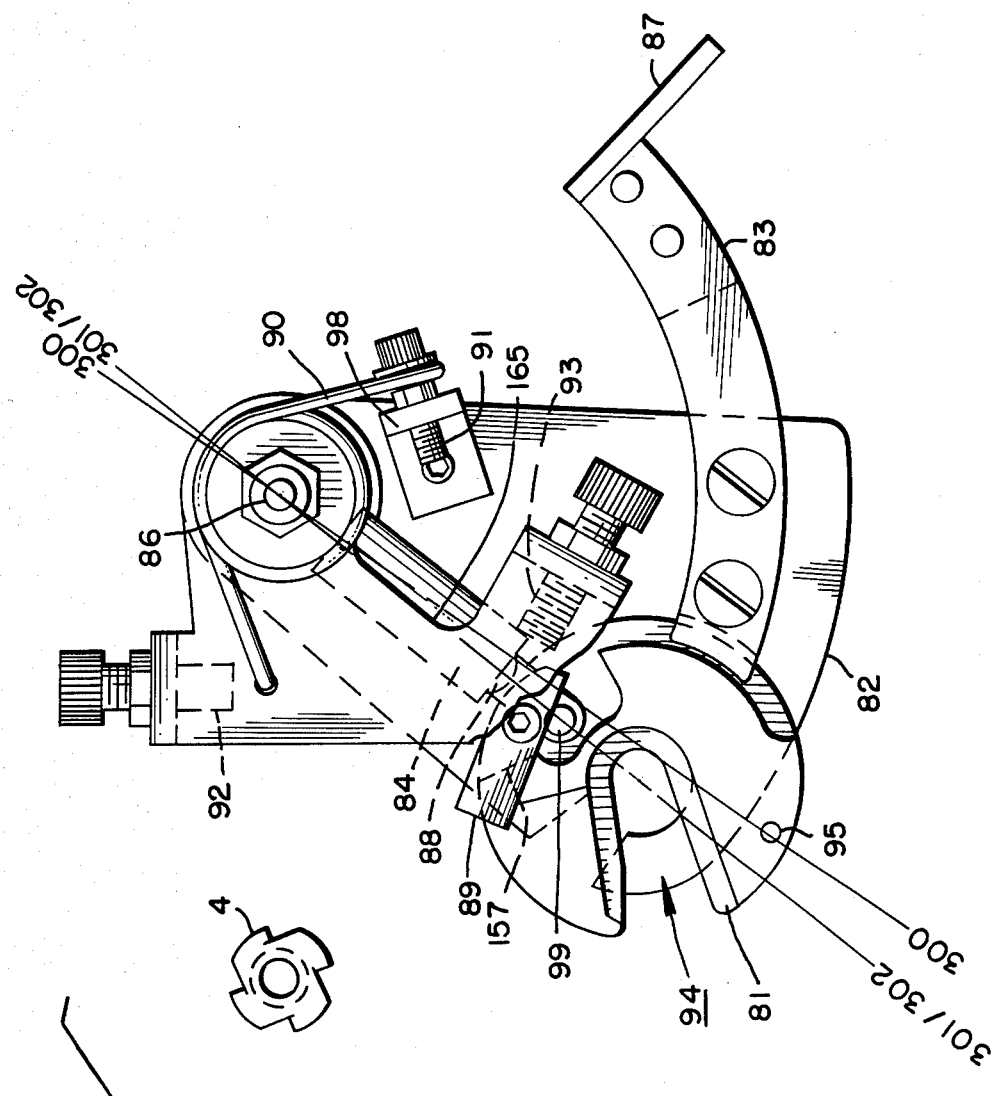
FIG. 27 is similar to FIG. 21 showing the positions of the same elements at the time that the tube bushing is pushed by the second stop into alignment with a line drawn between the center of rotation of the carry plate and the center of rotation of the connector holder.

For descriptive purposes, three reference lines are provided in FIGS. 21-28. Reference line 300—300 runs between the center of rotation of carry plate 82 and the center of rotation of connector holder 81 when the carry plate is in its loading station, or home position. Reference line 301—301 runs between the center of rotation of the carry plate 82 and the center of rotation of connector holder 81 regardless of where the carry plate is in its cycle. In FIGS. 21 and 28, reference lines 300—300 and 301—301 are coincident. Reference line 302—302 runs between the center of rotation of the carry plate 82 and the center of pin 85 which joins pusher arm 85 to connector holder 81. In FIGS. 23 and 27, reference lines 301—301 and 302—302 are coincident.

Referring to FIG. 22, the transfer mechanism is shown between the loading and unloading stations on its way to the unloading station. In this position, adjustable stop 91 is approaching edge 165 (shown in dotted lines) of support bracket 96 which determines the limit of travel of the transfer mechanism to place the holder in the unloading station. Once adjustable stop 91 hits edge 165 of the support bracket, further clockwise motion is not possible.

It is noted that a portion of spring 90 is carried with carry plate 82 since it is anchored on stop 91 which, in turn, is mounted on the carry plate by rigid support 98. Since the carry plate carries spring 90 in a direction to wind the spring around spring bushing 150, release of handle 87 by the operator automatically allows the carry plate to be brought back to its home position through the action of the spring. The operator normally releases handle 87 after the transfer mechanism has reached its unloading station and the connector is about to be removed from connector holder 81.

It is also noted that at this time in the cycle, connector holder 81 is still in its initial position and has not rotated relative to carry plate 82. This is indicated by the angle "α" which is the same in FIGS. 21 and 22. Holder 81 has not rotated relative to carry plate 82 in spite of the clockwise motion on the part of carry plate 82 because of the combined actions of stop pin 95 and pusher arm 85. The stop pin, which extends from holder 81, bears against the side of carry plate 82 on one side of the holder to prevent counter clockwise rotation of the holder. The pusher arm, by virtue of the action of spring 154, bears against pin 99, which is mounted on the holder, to provide a torque on the holder which keeps pin 95 against the carry plate and prevents clockwise rotation of the holder.

At the point in the cycle shown in FIG. 22, tube 84 has been carried by the carry plate far enough clockwise to have made contact with adjustable stop 92. Since adjustable stop 92 does not move relative to the transfer mechanism, the stop prevents any further clockwise motion on the part of tube 84 even though the carry plate continues to travel further towards the unloading station. As a result, stop 92 holds tube 84 while the carry plate continues moving resulting relative movement between tube 84 and pusher arm 85, on the one hand, and the carry plate, on the other hand. This relative movement causes connector holder 81 to rotate in the clockwise direction by virtue of the torque placed on it by pusher arm 85 through pin 99. Since the rotation of holder 81 is clockwise, pin 95 moves or rotates away from the side of carry plate 82 and does not interfere with the holder's rotation. This motion on the holder continues as carry plate 82 is rotated clockwise and reference line 302—302 comes into alignment and then passes beyond reference line 301—301.

Referring to FIG. 23, reference lines 301—301 and 302—302 are coincident. It can be seen in this Figure that connector holder 81 has rotated in a clockwise direction by an angle "β" which is greater than the angle "α" shown in FIG. 22. At this point in time in the cycle, carry plate 82 is still moving in the clockwise direction and tube 84 is being held relative to the movement of the carry plate by virtue of its being in contact with the end of stop 92. In addition, stop 91, also being carried by the carry plate, is closer to edge 165 of the support bracket 96.

Once reference line 301—301 passes through and beyond reference line 302—302, the snap-over effect of the spring (not shown) in tube 84 more rapidly pushes pusher arm 85 out from the tube. This action on the pusher arm causes a relatively rapid continuation of the clockwise motion of connector holder 81 to the position predetermined for it when the transfer mechanism reaches its unloading station. The snap-over effect of the spring in tube 84 quickly moves the tube to the position shown in FIG. 24 and forces pusher arm 85 out of the tube to the position shown in FIG. 24. The snap-over effect produced by the spring in tube 84 causes the tube to quickly remove itself away from the area at which it is in contact with stop 92 even though the carry plate tends to carry the tube with it in the clockwise direction.

FIG. 24 shows the transfer mechanism in the unloading station. It is in this position that the holder becomes free to move relative to the connector due to the presence of clearance slot 94. The holder moves relative to the connector during the return part of the transfer mechanism cycle which returns the transfer mechanism from its unloading station to its loading station. Clearance slot 94 of connector holder 81 is oriented relative to the carry plate to provide clearance for the removal of the connector from holder 81.

Connector holder 81 is maintained in the position shown in FIG. 24, represented by angle "γ", by the combined actions of shoulder 157 and pusher arm 85. The spring in tube 84 urges pusher arm 85 out of the tube providing a clockwise torque on holder 81 through pin 99 and preventing any counter clockwise rotation by the holder. Shoulder 157 contacts the pusher arm providing a stop which prevents the holder from rotating any further in the clockwise direction. These two forces on the holder keep it in the position shown in FIG. 24 during this portion of the cycle. The clockwise movement of carry plate 82 is stopped, or limited, by virtue of stop 91. Stop 91 is mounted on the carry plate and comes to rest against edge 165 of support bracket 96. Thus, stop 91 accurately locates a connector held by holder 81 at the unloading station, or installation station.

From approximately the time that the transfer mechanism assumes the position shown in FIG. 22 to the time it arrives at the position shown in FIG. 24, the top of holder 81 is close enough to the ram to have contact with guide pin 64 on the ram. The guide pin travels across and up the top of holder 81 until it drops into the opening in the center of the connector. At the time that this occurs, the limit of travel of the carry plate is reached and the transfer mechanism is in its unloading station. Also, at this point, the operator releases handle 87, dissipating the force thereon, and the transfer mechanism automatically returns to its loading station by virtue of the interaction of spring 90, stop 91 and bracket 98. The release of the handle begins the second or return phase of the transfer mechanism cycle.

Referring to FIG. 25, as spring 90 brings carry plate 82 in the counter clockwise direction to return it to the home position, cam 88, which is part of pusher arm 85, strikes cam follower 89. Cam follower 89 is rigidly attached to the carry plate support bracket 96 (not shown in this Figure). Between the time the carry plate leaves the unloading station and reaches the position shown in FIG. 25, holder 81 maintains its orientation relative to the carry plate, as depicted by the maintenance of angle "γ". Keeping holder 81 in this orientation during this period of the cycle is important for removing the connector from the holder. As carry plate 82 starts to return to its home position and moves away from the unloading station, the connector being carried by the holder, which has now been captured by guide pin 64, must have clearance to allow holder 81 to slip away. This clearance is provided by the above-described clearance means or region, slot 94.

Looking further into the cycle, however, after the carry plate has left the unloading station and has reached the point depicted in FIG. 25, holder 81 has completely cleared the connector. At this point, cam 88 interacts with cam follower 89 which begins to urge pusher arm 85 back into tube 84 against the action of the spring (not shown) within tube 84. As a result, connector holder 81 begins to rotate in the counter clockwise direction as the cam follows the shape of the cam follower. The purpose for this action is to return the holder to its original or initial position, depicted previously by the angle "α". The holder is returned to its initial position so that when it again approaches the unloading station, in the next cycle, ramp 156 is in a position to cooperate with guide pin 64 in the fashion described previously in conjunction with FIGS. 16a, 23 & 24.

FIG. 26 depicts the carry plate in a more advanced stage to returning to its home position than shown in FIG. 25. In FIG. 26, the cam follower has urged pusher arm 85 quite far back into tube 84 against the action of the spring (not shown) in tube 84 and the tube comes into contact with stop 93. At this point, it is noted that reference line 302—302 has remained generally in the same position relative to reference line 301—301, although the two lines are somewhat closer together due to the turning action imparted on holder 81 by cam follower 89.

Once tube 84 lodges against the end of stop 83, there is relative movement between tube 84 and carry plate 82 as the carry plate continues to be brought back to its home position. This relative movement brings reference line 302—302 into coincidence with reference line 301—301, as shown in FIG. 27, thereby allowing the snap-over effect of the spring inside tube 84 to work on the pusher arm in the direction opposite to that described in FIGS. 22, 23 & 24.

As the snap-over effect of the spring is relied upon and reference line 302—302 passes beyond the point where it is coincident with reference line 301—301, there is relative rapid movement of holder 81 in the counter clockwise direction. This is due to the spring in tube 84 urging pusher arm 85 out of the tube and applying a torque on the holder to rotate it in the counter clockwise direction. Holder 81 is brought in the counter clockwise direction until pin 95 hits the edge of carry plate 82 once again. This occurs as the carry plate reaches its home position. At this point in the cycle, reference lines 300—300 and 301—301 are again coincident and the transfer mechanism has reached its loading station. The pocket receiving means in holder 81 is shown in this Figure as empty since it is just before the next connector is dropped into holder 81. This position completes the full cycle of the transfer mechanism.

A functional description of the actions of the transfer mechanism and guide pin can now be made. As described above, connector holder 81 of the transfer mechanism has a ramp-like profile 156 between the holder edge and the pocket that contains the connector. As holder 81 approaches the position where the connector is to be loaded onto the ram, the ramp portion of the holder contacts guide pin 64. Due to the ramp profile, pin 64 retracts up into the ram. Eventually, as the transfer mechanism gets closer to reaching its full forward stroke at its unloading station, the pin rides up over the ramp, over the leading edge of the connector and drops into the hollow or opening in the flange and post of the connector. At this point, the transfer mechanism has completed its forward stroke and the connector is loaded onto the ram. Once it is aligned with the opening in the connector, pin 64 drops back to its unretracted position. The transfer mechanism, and its holder, then returns to its home position, the clearance slot providing a space in the holder so that there is not any interference between the connector and holder. The connector is aligned in the installation station so that it can be installed onto the cable.

As guide pin 64 passes onto the flange of the connector, but before the holder and carry plate reach the unloading station, holder 81 is rotated to re-orient the ramp and clearance region relative to the path that guide pin 64 traces across the holder as the holder is cycled with the carry plate. As the transfer mechanism leaves the loading station and approaches the unloading station, the path traced by guide pin 64 across holder 81 passes across the ramp region of the holder. The holder, during this part of the cycle, is in its initial position on the carry plate. However, just before the transfer mechanism reaches the unloading station, but after guide pin 64 has passed from the ramp of the holder into the flange of the connector, the control mechanism for controlling the movement of the holder re-orients the holder. The holder, at this time in the cycle, is re-oriented to bring slot 94, to a position to enable the connector to be removed from the holder and clear the holder. Slot 94 is actually a cutaway portion of holder 81 and there is also clearance provided in the underlying position of carry plate 82. The re-orientation occurring on the slot at this time effectively places it in the path traced by guide pin 64 and the connector on the holder as the transfer mechanism is returned to its home position. Once the holder has cleared the connector and guide pin, the control mechanism then returns the holder to its initial placement relative to the carry member. This is completed by the time the transfer mechanism returns to the loading station.

Figure 11:
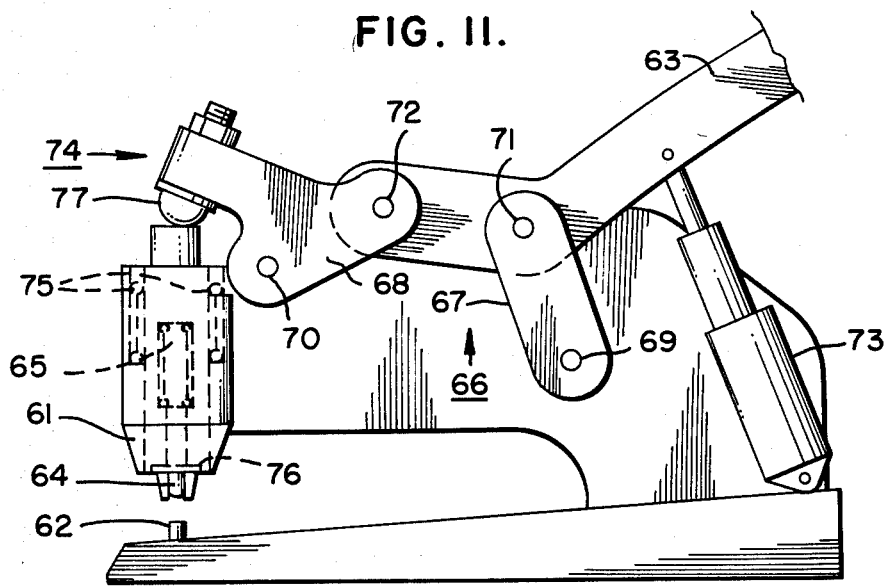
FIG. 11 is a partial diagrammatic side view of the installation machine showing the ram and linkage.

Referring to FIG. 11, the ram is operably supported within the frame of the machine and is driven by a linkage generally designated as 66. The linkage contains two links, 67 and 68, which, in turn, have two fixed pivot points, 69 and 70 respectively. The two movable points are connected to handle 63 which is activated by the operator. The linkage is designed so that as the operator pushes down on the handle a force is applied to the ram causing it to close on the anvil through force transmitter 74. The ram is biased in its upper-most position by spring 75 which returns the ram to its normal position after the connection is made. Full cycle assurance during the connection process is provided by rachet mechanism 73 which is connected between the machine frame and handle. The rachet assures that once a press cycle is undertaken it must continue through its full stroke before the handle is allowed to return to its normal upper position. The press is designed to apply 4000 lbs. force on the connector, however, substantially less force is required to complete the connection.

The amount of stroke that the ram takes, and, thus, the amount of thickness and degree of clinching that the connector makes on the cable can be adjusted through changing the position of the force transmitter contact member 77. This dimension is generally optimized for the particular size connector that is used. The electrical resistance of the connection is inversely proportional, to a point, to the retention force on the connector after installation. Once the optimized dimension is arrived at for a given connector, the stroke of the ram is permanently set to this dimension. The apparatus maintains this dimension within very close tolerances thereby reliably and repeatably producing the optimized installed dimension connection after connection.

Anvil 62 is fully described in the first part of this application as is the process by which the connection is made. The anvil is mounted on the frame of the machine in alignment with the ram. The configuration of the connector has also been described as has the function of the tapered wall on its non-flanged end which carries out the puncture or cutting action on the flat conductor cable as insulation occurs.

The manner in which an operator uses the mechanism to affect an end connection, such as to accommodate a transition box mating connection, is quite straight forward. The locator plate is set at the correct spacing and the operator places the flat conductor cable against the locator's side plate and front guide to align the conductor to the insulation station. The operator, with one hand, grasps the transfer mechanism handle and rotates the transfer mechanism to place a connector onto the ram. He then presses down on the press handle to make the connection.

As the transfer mechanism handle is rotated, it swings the connector already existing in its pocket to the ram area. The connector guide pin is guided up over the transfer mechanism and connector and drops into the opening in the connector. The operator releases the transfer mechanism and the torsion spring drives it back to its home position. During this latter step, the connector is being held in place by the ram's guide pin and the clearance slot in the holder on the transfer mechanism is oriented to provide clearance between the connector and holder as the mechanism returns to its home position. As the transfer mechanism reaches its home position, the next connector drops from its supply tube into the pocket in the transfer mechanism in preparation for the next cycle. Meanwhile, the connector is held by the ram over and in alignment with the cable and anvil. The operator, upon activating the press handle, causes the ram and the connector, which is held by it, to be driven down onto the anvil to make the connection with the cable. After the press handle is fully depressed by the operator, the ram is allowed to retract to its home position bringing the connector guide pin with it and removing it from the connector.

Other types of joints are made with flat cable connectors such as splices and taps. In both of these cases, the locator assembly is generally removed from the mechanism and a template is used to site the location on the cable where the connection is to be made. However, in both of these cases, the same type of connector and machine operation can be used to make a connection as described with the transition box mating connector.

The installation machine described above accomplishes a strong electrical and mechanical connection between the flat conductor cable and connector. The device is portable and the process of making a connection is exactly repeatable so that reliable connections can be made everytime. The actual installation step occurs in one continuous, quick, easy action. The installation machine, and the connectors used therewith, provide a universal system for all applications of connectors onto flat conductor cable.

It should be understood that the foregoing description is only illustrative of the invention. Various alternatives and modifications of the structural and functional features of the installation apparatus can be devised by those skilled in the art without departing from the invention. Accordingly, the present invention is intended to embrace all such alternatives, modifications and variances which fall within the spirit and scope of the appended claims.

What is claimed is:

1. The method of sequentially transferring cylindrical connectors from a supply of connectors at a loading station to an unloading station which includes a capture means comprising:
   (a) loading a connector by moving it axially onto a connector holder located at a loading station, the connector holder being formed with a ramp and a clearance slot;
   (b) transferring the holding and connector to the unloading station by movement radially with respect to the connector;
   (c) axially shifting the capture means from a first location by the force applied by the ramp on the moving holding;
   (d) axially shifting the capture means back to its first location whereby the connector is captured and retained by the capture means upon the arrival of the holder and connector at the unloading station;
   (e) reorienting the holder as it approaches the unloading station to enable the clearance slot to clear the connector as the holder leaves the unloading station; and
   (f) transferring the holder, without a connector, back to the loading station.

2. The method as set forth in claim 1 wherein the steps are repeated.

3. The method as set forth in claim 2 wherein the reorienting step further includes returning of the holder to its initial position before the holder arrives back to the loading station.

4. The method as set forth in claim 2 wherein a connector is loaded onto the holder only at the time that the holder is in the loading station and does not already have a connector thereon.

5. A method of installing a hollow, cylindrical connector, having a flanged end and a non-flanged end, onto a flat conductor cable comprising:
   (a) aligning the connector with a ram means of an installation machine by:
      i. loading a connector by moving it axially onto a fixed connector holder located at a loading station, the connector holder being formed with a ramp and a clearance slot;
      ii. transferring the holder and connector by movement radially with respect to the connector from the loading station to the unloading station;
      iii. axially shifting a connector capture means at the unloading station from a first location by the force applied by the ramp on the moving holder;
      iv. axiallly shifting the clearance slot back to its first location whereby the connector is captured and retained by the clearance slot upon the holder and connector arriving at the unloading station;
      v. reorienting the holder as it approaches the unloading station to enable the clearance means to clear the connector as the holder leaves the unloading station; and
      vi. transferring the holder, without a connector, back to the loading station;
   (b) pressing the non-flanged end of the rivet connector onto and through the conductor portion of the flat conductor cable and
   (c) rolling the non-flanged end of the conductor after it has passed through the conductor to form an eyelet thereon.

6. The method as set forth in claim 5 further including the step of placing the portion of the flat conductor cable to be connected in the installation station prior to the pressing step.

7. Apparatus for sequentially transferring cylindrical connectors from a loading station having a supply of connectors to an unloading station whereat the connectors may be utilized comprising:
  (a) carry means mounted for movement relative to a frame;
  (b) connector holding means operatively associated with said carry means and mounted for reciprocal movement along a path of movement between the loading station and the unloading station, said holding means having a pocket for the engagement and supporting of a connector moved into engagement therewith;
  (c) loading means at the loading station for axially moving a connector into said pocket of said holding means at the loading station;
  (d) drive means coupled to said holding means for moving said holding means and a supported connector radially from the loading station to the unloading station;
  (e) connector capture means mounted at the unloading station for movement axially with respect to said holding means and a supported connector from a normal position in the path of movement of said holding means and a supported connector to a second position out of such path of movement;
  (f) ramp means formed on said holding means for axially moving said capture means out of the path of movement of said holding means and connector until said holding means and connector arrive at the unloading station whereat said capture means will axially return to its normal position to preclude radial movement of a supported connector;
  (g) clearance means in the form of a slot formed in said holding means for enabling the supported connector to be disengaged from said holding means as said holding means is moved along its path of movement from the unloading station back to the loading station; and
  (h) control means operatively associated with and mounted for movement with respect to said holding means for rotating said holding means from a first orientation whereby said ramp means guides said capture means for axial movement to contact and retain the connector while said clearance means precludes radial movement of a supported connector with respect to said holding means as said holding means approaches the unloading station to a second orientation whereby said clearance means is positioned to enable said holding means to clear the connector retained by said capture means as said holding means moves from the unloading station back to the loading station.

8. The apparatus as set forth in claim 7 further including the unloading station and means to secure said drive means to said carry member for moving the holding means from the loading station to the unloading station.

9. The apparatus as set forth in claim 8 further including bias means coupled to said carry member to urge said carry member and said holding means toward the loading station whereby the holding member will be automatically returned to the loading station when force provided to the drive means for moving the holding member towards the unloading station is dissipated.

10. The apparatus as set forth in claim 8 wherein said holding means is rotatably mounted in said carry member and further including means mounted on said carry means to pivotally couple said control means to said carry member and to said holding means to thereby rotate said holding means dependent upon the position of said holding means between the loading station and the unloading station.

11. The apparatus as set forth in claim 10 wherein said control means initially places said ramp means in the path traced thereon by said capture means as said holding means approaches the unloading station and then places said clearance means in the path traced by said capture means thereon as said holding means leaves the unloading station.

12. The apparatus as set forth in claim 11 wherein said control means returns said holding means to its initial placement relative to said carry member by the time that said holding means returns to the loading station.

13. The apparatus as set forth in claim 7 wherein said clearance means is a slot cut into said holding means and said carry member upon which it is mounted.

14. The apparatus as set forth in claim 7 further including a feed tube at the loading station and a supply of cylindrical connectors in said tube, said connectors remaining in said tube at all times other than when said pocket means in said holding means is empty and in direct axial alignment with said tube and further including skid means mounted on the carry member for movement therewith for preventing further feeding of said connectors to said holding means except when said holding means is empty and in axial alignment with a connector in said tube.

15. Apparatus for installing cylindrical connectors onto flat conductor cables comprising:
  (a) a loading station positioned on the apparatus;
  (b) a supply of connectors positioned at said loading station;
  (c) an unloading station positioned on the apparatus remote from said loading station;
  (d) means mounted adjacent said unloading station for positioning a predetermined portion of a flat conductor cable at said unloading station;
  (e) transfer means for removing a connector from said supply at said loading station and for aligning said connector with the predetermined portion of the flat conductor cable at said unloading station, said transfer means including:
    i. carry means mounted for movement relative to a frame;
    ii. connector holding means operatively associated with said carry means and mounted for reciprocal movement along a path of movement between said loading station and said unloading station, said holding means having a pocket for the engagement and supporting of said connector axially moved into engagement therewith;
    iii. loading means for axially moving said connector into said pocket of said holding means at said loading station;
    iv. drive means coupled to said holding means for moving said holding means and said supported connector radially from said loading station to said unloading station;
    v. connector capture means mounted at said unloading station for movement axially with respect to said holding means and said supported connector from a normal position in the path of movement of said holding means and said supported connector to a second position out of such path of movement;

vi. a ramp means formed on said holding means for axially moving said capture means out of the path of movement of said holding means and connector until said holding means and connector arrive at said unloading station whereat said capture means will axially return to its normal position to preclude radial movement of said supported connector;

vii. a clearance means in the form of a slot formed in said holding means for enabling said supported connector to be disengaged from said holding means as said holding means is moved along its path of movement from said unloading station back to said loading station;

viii. control means mounted in operative association with said holding means for rotating said holding means from a first orientation whereby said ramp means guides said capture means for axial movement to contact and retain said connector while said clearance means precludes radial movement of said supported connector with respect to said holding means as said holding means approaches said unloading station to a second orientation whereby said clearance means is positioned to enable said holding means to clear said connector retained by said capture means as said holding means moves from said unloading station back to said loading station; and (f) means at said unloading station for pressing said connector into the flat conductor cable whereby electrical current can pass from the flat conductor cable to the conductor.

16. The apparatus as set forth in claim 15 wherein said means for pressing includes a fixed anvil and a ram movable toward and away from said anvil.

17. Apparatus for installing a rivet-like connector onto a flat conductor cable comprising:
(a) a loading station positioned on the apparatus;
(b) a supply of connectors positioned at said loading station, each of said connectors being formed as a cylinder having a post and a flange and an axial opening therethrough;
(c) an unloading station positioned on the apparatus remote from said loading station, said unloading station having an axially shiftable guide pin positioned thereat;
(d) means for positioning a predetermined portion of the flat conductor cable at said unloading station;
(e) transfer means for removing a connector from said supply at said loading station and axially aligning said opening of the connector with said guide pin means at an unloading station, said transfer means including;
  i. carry means mounted for movement relative to a frame;
  ii. connector holding means mounted for reciprocal movement along a path of movement between said loading station and said unloading station, said holding means having a pocket for the engagement and supporting of said connector axially moved into engagement therewith;
  iii. loading means at said loading station for axially moving said connector into said pocket of said holding means at said loading station;

iv. drive means coupled to said holding means for moving said holding means and said supported connector radially from the loading station to the unloading station;
  v. a ramp means formed on said holding means for axially moving said guide pin out of the path of movement of said holding means and connector until said holding means and connector arrive at the unloading station whereat said guide pin will axially return to its normal position to preclude radial movement of a supported connector;
  vi. a clearance means in the form of a slot in said holding means for enabling the supported connector to be disengaged from said holding means as said holding means is moved along its path of movement from said unloading station back to said loading station; and
  vii. control means operatively associated with and mounted for reciprocal movement with said holding means for rotating said holding means from a first orientation whereby said ramp means guides said guide pin for axial movement to contact and retain said connector while said clearance means precludes radial movement of said supported connector with respect to said holding means as said holding means approaches said unloading station to a second orientation whereby said clearance means is positioned to enable said holding means to clear said connector retained by said capture means as said holding means moves from said unloading station back to said loading station; and
(f) means positioned at said unloading station for pressing the connector into and through said flat conductor cable at said unloading station, said means for pressing including a ram means and anvil means and means for causing relative movement therebetween.

18. The apparatus as set forth in claim 17 wherein said anvil is fixed and said ram means is movable thereto.

19. The apparatus as set forth in claim 17 wherein said guide pin means retains said connector in said ram until it is connected to the flat conductor cable.

20. The apparatus as set forth in claim 17 wherein said flange portion of the connector at said unloading station is more proximate said ram than said anvil.

21. The apparatus as set forth in claim 17 wherein said connector post has a tapered wall therein on its end opposite said flange.

22. Apparatus for transferring cylindrical connectors from a first station to a second station comprising:
(a) carry means mounted for movement relative to a frame;
(b) connector holding means mounted for reciprocal movement along a path of movement between the first station and the second station, said holding means having a pocket for the engagement and supporting of a connector axially moved into engagement therewith;
(c) drive means coupled to said holding means for moving said holding means and a supported connector radially from the loading station to the unloading station;
(d) connector capture means mounted at the unloading station for movement axially with respect to said holder and a supported connector from a normal position in the path of movement of said holding means and a supported connector to a second position out of such path of movement;

(e) a ramp means formed on said holding means for axially moving the capture means out of the path of movement of said holding means and connector until said holding means and connector arrive at the unloading station whereat said capture means will axially return to its normal position to preclude radial movement of a captured connector;

(f) a clearance means in the form of a slot in said holding means for enabling the supported connector to be disengaged from said holding means as said holding means is moved along its path of movement to the loading station; and (g) control means operatively associated with and mounted for reciprocal movement with said holding means for rotating said holding means from a first orientation whereby said ramp means guides said capture means for radial movement to contact and retain the connector while said clearance means precludes radial movement of a supported connector with respect to said holding means as the holding means approaches the unloading station to a second orientation whereby said clearance means is positioned to enable said holding means to clear the connector retained by said capture means as said holding means moves from the unloading station back to the loading station.

* * * * *